(12) United States Patent
Fredrickson

(10) Patent No.: US 10,849,307 B2
(45) Date of Patent: Dec. 1, 2020

(54) MANURE RAKE APPARATUS

(71) Applicant: Daniel Fredrickson, Lakevill, MN (US)

(72) Inventor: Daniel Fredrickson, Lakevill, MN (US)

( * ) Notice: Subject to any disclaimer, the term of this patent is extended or adjusted under 35 U.S.C. 154(b) by 10 days.

(21) Appl. No.: 16/172,267

(22) Filed: Oct. 26, 2018

(65) Prior Publication Data

US 2020/0128793 A1 Apr. 30, 2020

(51) Int. Cl.
| | | |
|---|---|---|
| *A01D 9/00* | (2006.01) | |
| *A01D 7/02* | (2006.01) | |
| *A01B 1/02* | (2006.01) | |
| *A01K 1/01* | (2006.01) | |
| *A01B 1/20* | (2006.01) | |

(52) U.S. Cl.
CPC ............ *A01K 1/01* (2013.01); *A01B 1/026* (2013.01); *A01B 1/20* (2013.01); *A01D 7/02* (2013.01); *A01D 9/00* (2013.01)

(58) Field of Classification Search
CPC ........ A01K 1/01; A01K 1/0114; A01B 1/026; A01B 1/20; A01B 7/02; A01B 9/00; A01B 9/02; A01B 9/06
USPC ............... 294/50, 50.5, 55.5, 58, 59, 179
See application file for complete search history.

(56) References Cited

U.S. PATENT DOCUMENTS

| | | | |
|---|---|---|---|
| 4,730,860 A * | 3/1988 | Padgett | A01B 1/02 294/49 |
| 4,865,372 A | 9/1989 | Gabriel | |
| 5,417,044 A | 5/1995 | Russo | |
| 5,517,947 A | 5/1996 | Christman | |
| 5,799,998 A | 9/1998 | Glitterman, III | |
| 5,927,513 A | 7/1999 | Hart | |
| 6,022,058 A | 2/2000 | O'Rourke | |
| 6,334,538 B1 | 1/2002 | Nettles | |
| 6,701,868 B1 | 3/2004 | Shepherd | |
| 6,836,995 B1 | 1/2005 | Zernov | |
| 6,920,714 B1 | 7/2005 | Modglin | |
| 7,014,232 B2 * | 3/2006 | Bosa | A01B 1/026 16/426 |
| 7,044,520 B2 | 5/2006 | Robertson, Jr. et al. | |
| 7,222,899 B1 | 5/2007 | Berto | |
| 7,222,900 B1 | 5/2007 | Berto | |
| 7,401,657 B2 | 7/2008 | Huber | |
| D584,583 S | 1/2009 | Burks | |
| 7,540,544 B2 | 6/2009 | Berto | |
| 7,565,882 B2 | 7/2009 | Billi et al. | |
| D600,519 S | 9/2009 | Walker et al. | |
| 7,673,755 B2 | 3/2010 | Gemmil | |
| 7,946,638 B2 | 5/2011 | Berto | |
| D652,700 S | 1/2012 | Flechel et al. | |
| 8,262,145 B2 | 9/2012 | Berto | |
| 8,695,807 B2 | 4/2014 | Knittel | |
| 9,179,642 B2 | 11/2015 | Knittel | |

(Continued)

FOREIGN PATENT DOCUMENTS

DE 102007026355 A1 * 12/2008 ............ B07B 1/02

*Primary Examiner* — Dean J Kramer
(74) *Attorney, Agent, or Firm* — Haugen Law Firm PLLP

(57) ABSTRACT

An animal waste rake or barn stall rake that separates waste from animal bedding such as wood chips or straw. The manure rake or barn stall rake apparatus of the invention includes a shaker assembly that both vibrates and shakes the manure basket of the rake to expeditiously separate the manure from the bedding.

21 Claims, 29 Drawing Sheets

(56) References Cited

U.S. PATENT DOCUMENTS

| | | |
|---|---|---|
| 9,215,842 B2 | 12/2015 | Chrostowski |
| 2007/0222242 A1 | 9/2007 | Daniels, Sr. |
| 2013/0180896 A1 | 7/2013 | Ramsay et al. |
| 2016/0281313 A1 | 9/2016 | Lindau |

* cited by examiner

MANURE RAKE APPARATUS

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to a barn stall rake that oscillates rapidly to thereby separate manure from various forms of bedding material. More particularly, this invention pertains to a barn stall rake that is made to both vibrate and shake the manure basket. The manure rake of the present invention is made to vibrate in tangential, orthogonal or other non-parallel directions to a shaking motion to thereby more rapidly and efficiently separate barn waste or manure from reusable bedding materials.

BACKGROUND

Over the years barns have been utilized to provide a safe environment for livestock. Further, many animal owners prefer a barn to isolate their animals from harsh outdoor elements and predators. Some owners may confine their barn animals to stalls where bedding such as straw or wood chips are piled in the stall to provide a comfortable and cleanly environment for the animal. From time to time the stall should be cleaned to remove manure from the stall. Although some owners prefer to replace all the bedding each time a stall is cleaned, other owners may prefer to reuse at least some of the bedding material.

Many apparatus have been devised to aid an animal owner in cleaning up the waste of their animal. By way of example, when cleaning a stall a shovel may be used to scoop the entire bedding material into a cart or wheel barrow. All of the material within the stall may be removed and replaced to ensure manure is entirely removed. Alternatively, a pitch fork may be utilized in an attempt to isolate the manure from the bedding. Use of a pitch fork, however, may prove challenging when the manure is entangled in the bedding. Further, although a simple shovel or rake may be used in an attempt to sift the manure, a significant amount of energy from the user is required to undertake such a task.

Additionally, although shovels and pitch forks have been used in the past to scoop waste, use of a straight handled shovel or pitch fork requires undesirable strains upon a user. Also, once the waste is scooped with a shovel or pitch fork, the lifting and shaking may require an undesirable bending or twisting motion by the user. There is accordingly a need for a manure rake tool that is simple to operate and that efficiently separates manure from bedding materials. There is a further need for a tool that is operable by the user in an up-right, standing or walking position that does not require a shaking motion by the user.

SUMMARY

Embodiments according to aspects of the invention provide an animal waste removal tool that facilitates the removal of waste enmeshed in bedding materials. In accordance with certain aspects of the invention, the invention includes a low voltage, variable speed motor coupled to a shaker assembly that both vibrates and shakes the basket or waste receptacle of the animal waste removal tool. Generally, the shaker assembly causes the rake to oscillate in three dimensions rather than two dimensions. Other aspects of the invention include an ergonomic handle and hand grips.

In an embodiment of the invention, the animal waste or manure rake tool of the present invention generally includes a waste receptacle, handle, hand grips, rotary motor, and shaker assembly. The waste receptacle has a forward facing edge that defines an opening into the receptacle. The handle includes a sheath having a hollow interior and drive shaft extending through the hollow interior of the sheath, wherein a first end of the handle is fixed to the receptacle and a second end of the handle is fixed to a hand grip. A second hand grip is fixed to the sheath of the handle between the first end of the handle and the second end of the handle. The second hand grip may be aligned with the center of mass of the manure rake. The rotary motor is coupled to a first end portion of the drive shaft. The drive shaft includes a coupler that couples the shaft to an aperture extending through an eccentric weight. The shaker assembly includes a housing, waste receptacle end cap, handle end cap, and the eccentric weight. The drive shaft further extends through the handle end cap, housing and waste receptacle end cap. The aperture of the eccentric weight extends through the eccentric weight such that a central axis of the aperture is not perpendicular to the rotational plane of the weight.

In accordance with aspects of the invention the shaker assembly may include a rubbing block extending from the handle end cap and arranged to contact the eccentric weight once every full revolution of the eccentric weight. Ball bearings may be engaged to the shaker assembly and the drive shaft to provide a smooth rotation of the drive shaft and reduce noise associated with rotation of the drive shaft. The rotary motor may be of a low voltage, variable speed type. Further, the rotary motor may be of a cordless type. Preferably, the rotary motor rotates the drive shaft and eccentric weight at a rate ranging between 850 and 950 revolutions per minute. The waste receptacle may include slots extending through the receptacle to allow small particulate to pass through the slots while capturing manure within the receptacle. Further, the waste receptacle includes a row of tines extending from the forward facing edge of the receptacle. Also, the waste receptacle may alternatively include a scraper extending from the forward facing edge of the receptacle.

In accordance with aspects of the invention, an embodiment of the invention may include a waste receptacle, handle, hand grips, motor, shaker assembly and a rubbing block. The waste receptacle has a forward facing edge defining an opening into the receptacle. The handle includes a sheath and drive shaft extending through an interior of the sheath, wherein a first end of the handle is fixed to the receptacle and a second end opposing the first end is fixed to a hand grip. An additional hand grip is fixed to the sheath of the handle between the first end of the handle and the second end of the handle. The motor may be of a rotary type that is coupled to a first end portion of the drive shaft. The shaker assembly includes a housing, waste receptacle end cap, handle end cap, and an eccentric weight. The drive shaft extends through the handle end cap, housing and waste receptacle end cap, wherein the drive shaft includes a coupler that couples the drive shaft to an aperture extending through the eccentric weight. A rubbing block extends from the handle end cap and is arranged to contact the eccentric weight once every full revolution of the eccentric weight. The aperture of the eccentric weight extends through the eccentric weight such that a central axis of the aperture is not perpendicular to the rotational plane of the weight.

Further in accordance with aspects of this embodiment, the drive shaft may include ball bearings coupled to the shaft and engaged to the shaker assembly. Further, the rotary motor may be of a variable speed and cordless types. Further, the rotary motor may be of a type to preferably rotate the drive shaft and eccentric weight at a rate ranging between 850 and 950 revolutions per minute. The aperture extending through the eccentric weight may have a square cross section to engage a square coupling of the drive shaft.

Also in accordance with aspects of the invention, an embodiment of the invention may include a waste receptacle, a handle, hand grips, a motor, a shaker assembly and a rubbing block. The waste receptacle may have a forward facing edge that defines an opening into the receptacle. The handle may include a sheath and drive shaft extending through an interior of the sheath. A first end of the handle may be fixed to the receptacle and a second end opposing the first end may be fixed to a hand grip. A second hand grip may be fixed to the sheath of the handle between the first end of the handle and the second end of the handle to provide an added balance to the manure rake. The motor may be of a rotary type that is coupled to a first end portion of the drive shaft. The shaker assembly may include a housing, waste receptacle end cap, handle end cap, and an eccentric weight. The drive shaft extends through the handle end cap, housing and waste receptacle end cap, wherein the drive shaft includes a coupler that couples the shaft to an aperture extending through the eccentric weight. The aperture extending through the eccentric weight may have a square cross section. Ball bearings may be engaged to the shaker assembly and the drive shaft. Further, the rubbing block may extend from the handle end cap and may be arranged to contact the eccentric weight once every full revolution of the eccentric weight. Also, the aperture of the eccentric weight extends through the eccentric weight such that a central axis of the aperture is not perpendicular to the rotational plane of the weight.

In certain aspects of this embodiment of the invention, the rotary motor may be of a cordless, variable speed type that rotates the drive shaft and eccentric weight at a rate ranging between 850 and 950 revolutions per minute. Further, the waste receptacle may include slots that extend through the receptacle to allow small particulate to pass through the slots. Also, the waste receptacle may include a row of tines extending from the forward facing edge of the receptacle. Alternatively, the waste receptacle may include a scraper extending from the forward facing edge of the receptacle.

In accordance with an embodiment of the invention the manure rake is particularly well suited to scoop up barn stall bedding material and quickly separate manure from the bedding material. The drive shaft rotates the eccentric weight, however the bore or aperture extending through the weight is not aligned parallel with the axis of the drive shaft. In this manner, less torque is required to start the spinning of the eccentric weight and the vibration that is created from the spinning of the eccentric weight is perceived to be more efficient. Further, the rubbing block is arranged to contact the eccentric weight once per revolution. In this manner the manure rake shakes when the rubbing block contacts the eccentric weight. The combination of vibrating and shaking the waste receptacle provides for a more efficient and improved separation of the manure from bedding material over prior manure forks.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
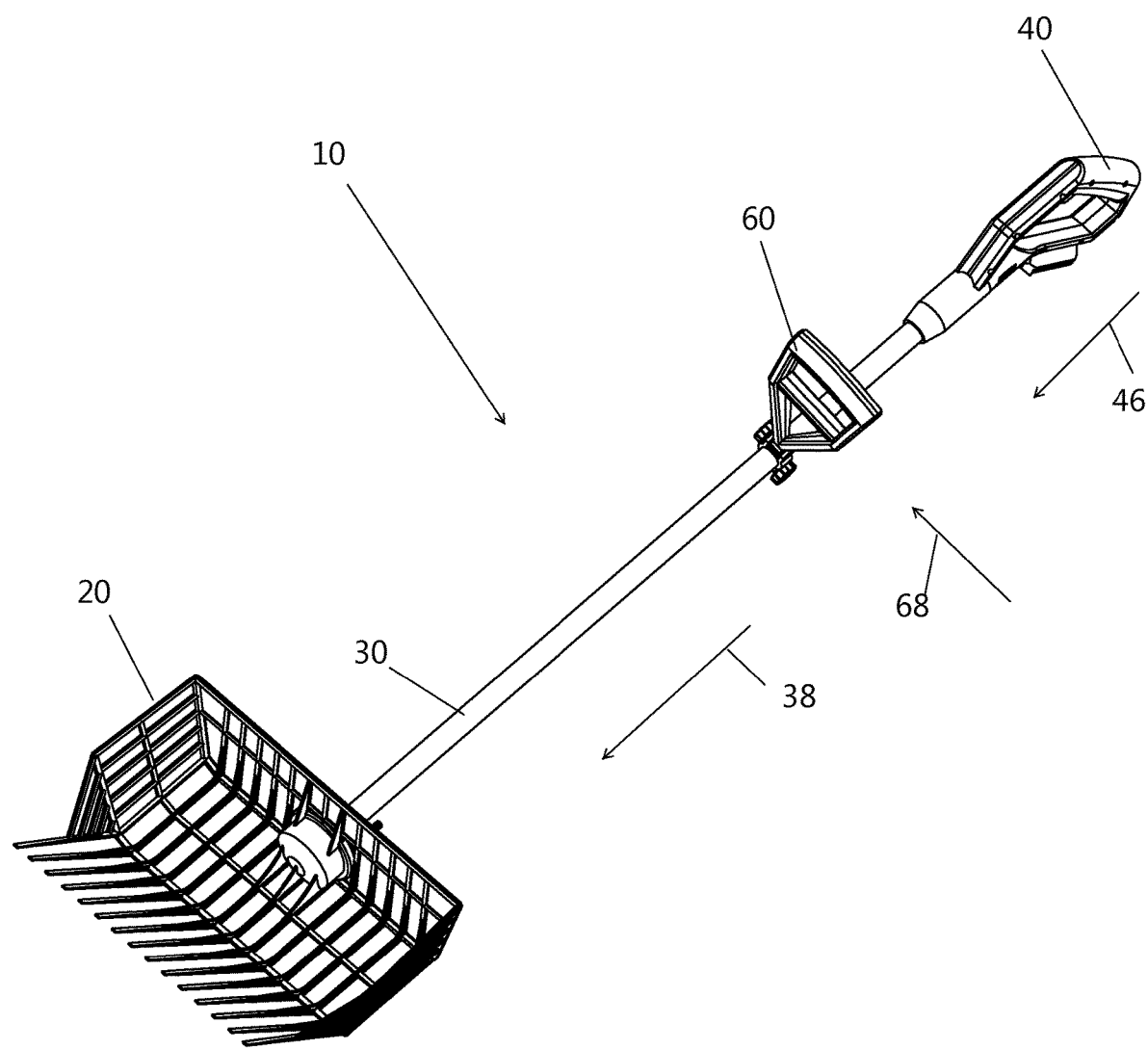
FIG. 1 is a front right perspective view of a manure rake apparatus in accordance with an embodiment of the invention.
Figure 2:
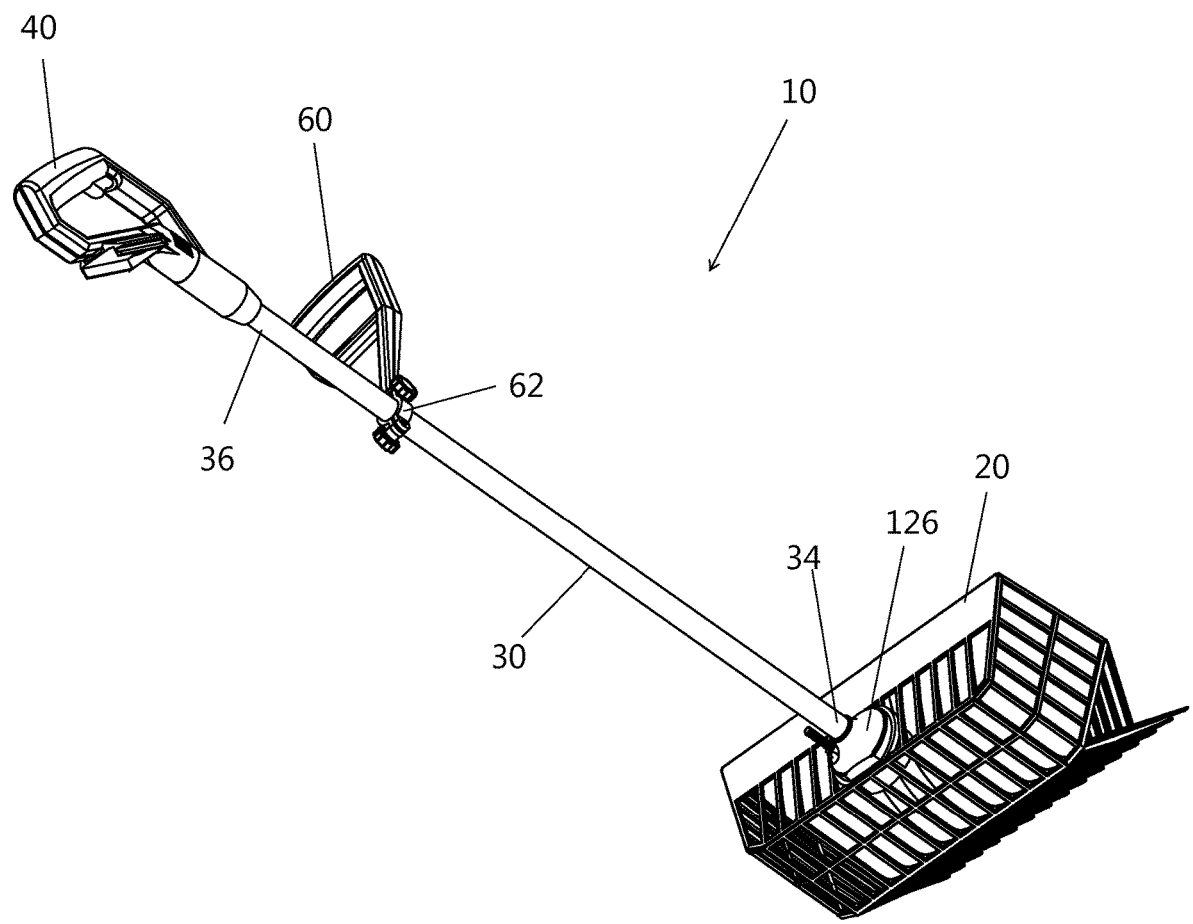
FIG. 2 is a back left perspective view of the manure rake apparatus of the type shown in FIG. 1.
Figure 3:
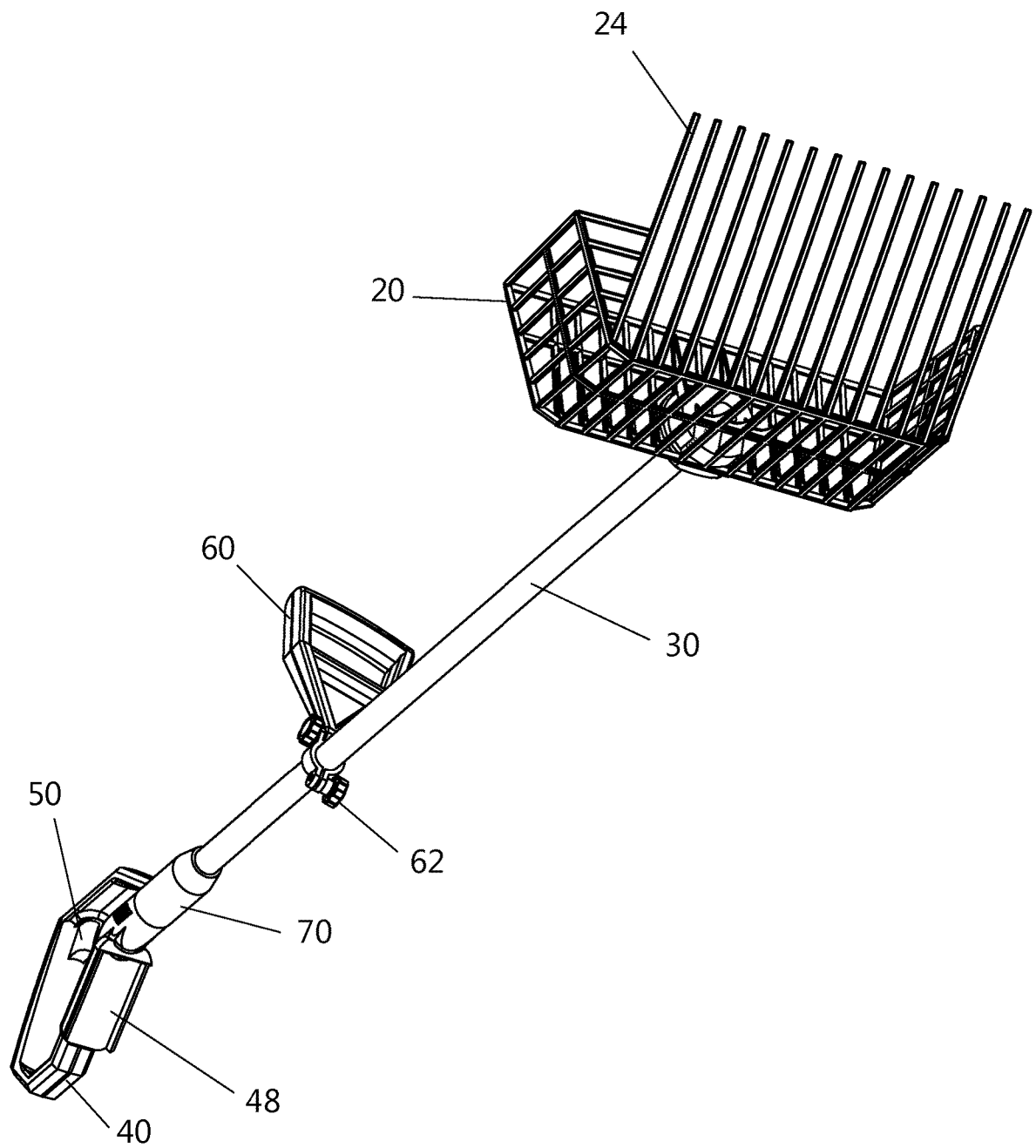
FIG. 3 is a partial sectioned front right perspective view of a waste receptacle or basket in accordance with an embodiment of the invention.
Figure 4:
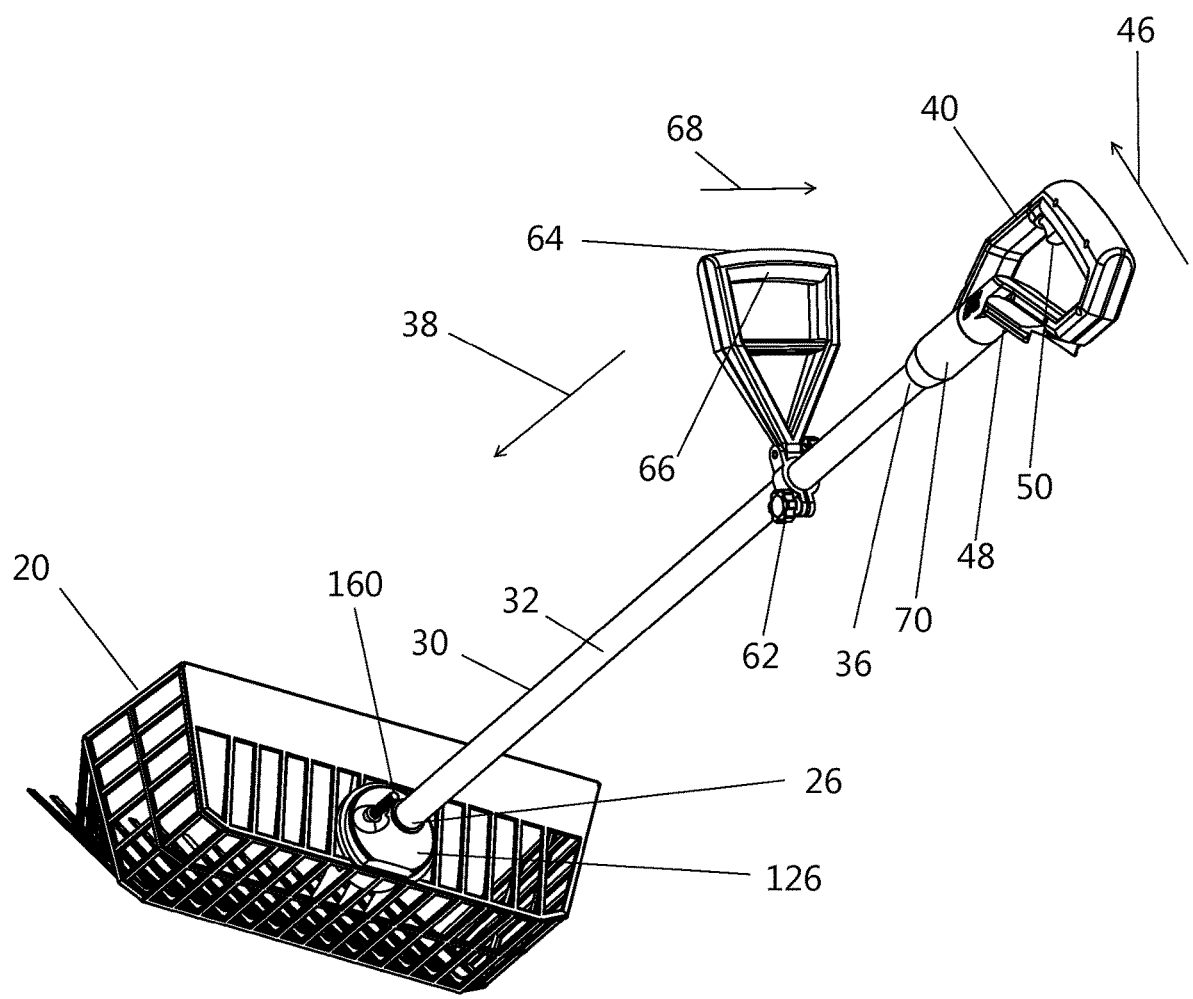
FIG. 4 is a front bottom left perspective view of a manure rake apparatus in accordance with an embodiment of the invention.
Figure 5:
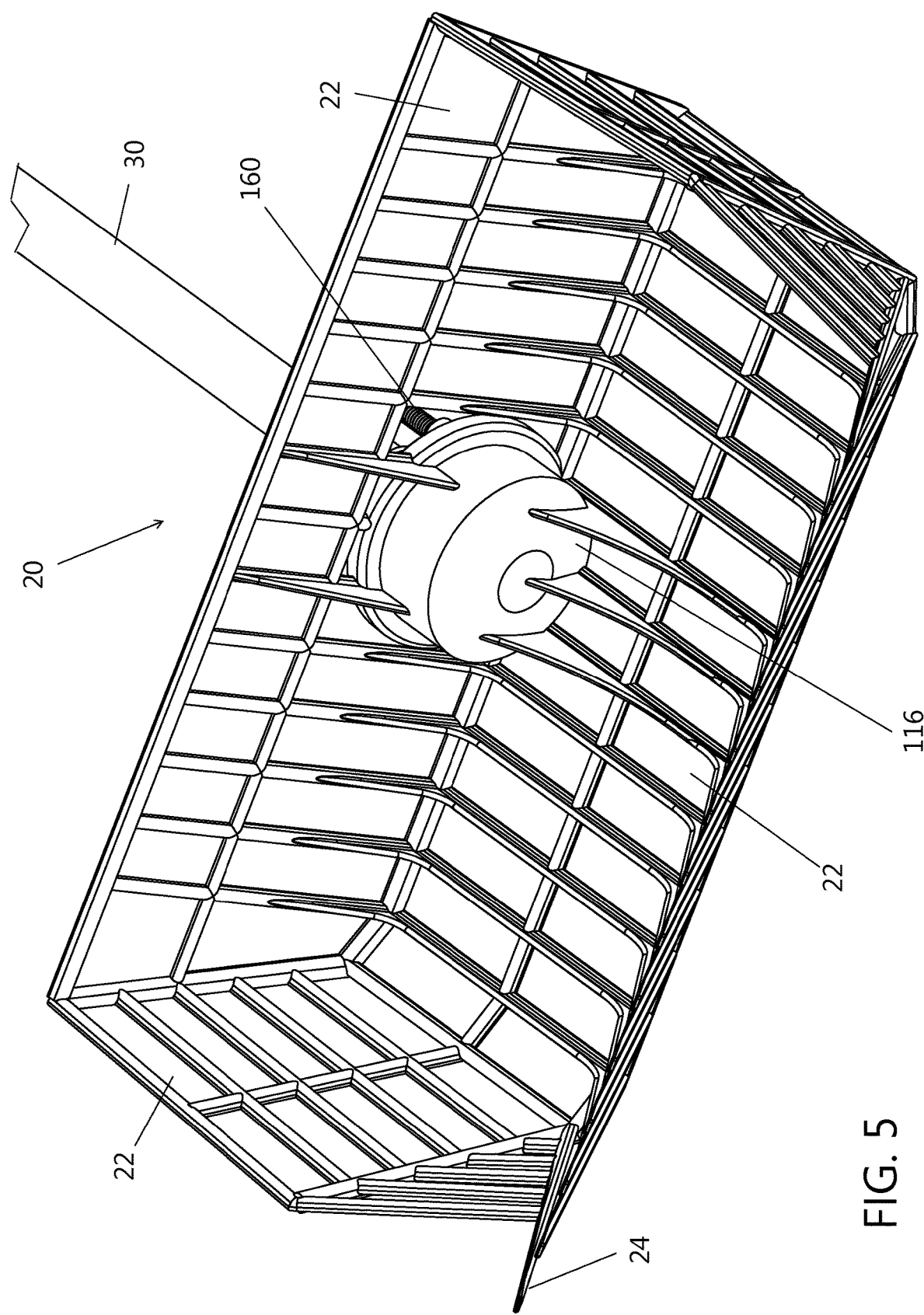
FIG. 5 is a back right perspective view of a manure rake apparatus in accordance with an embodiment of the invention.
Figure 6:
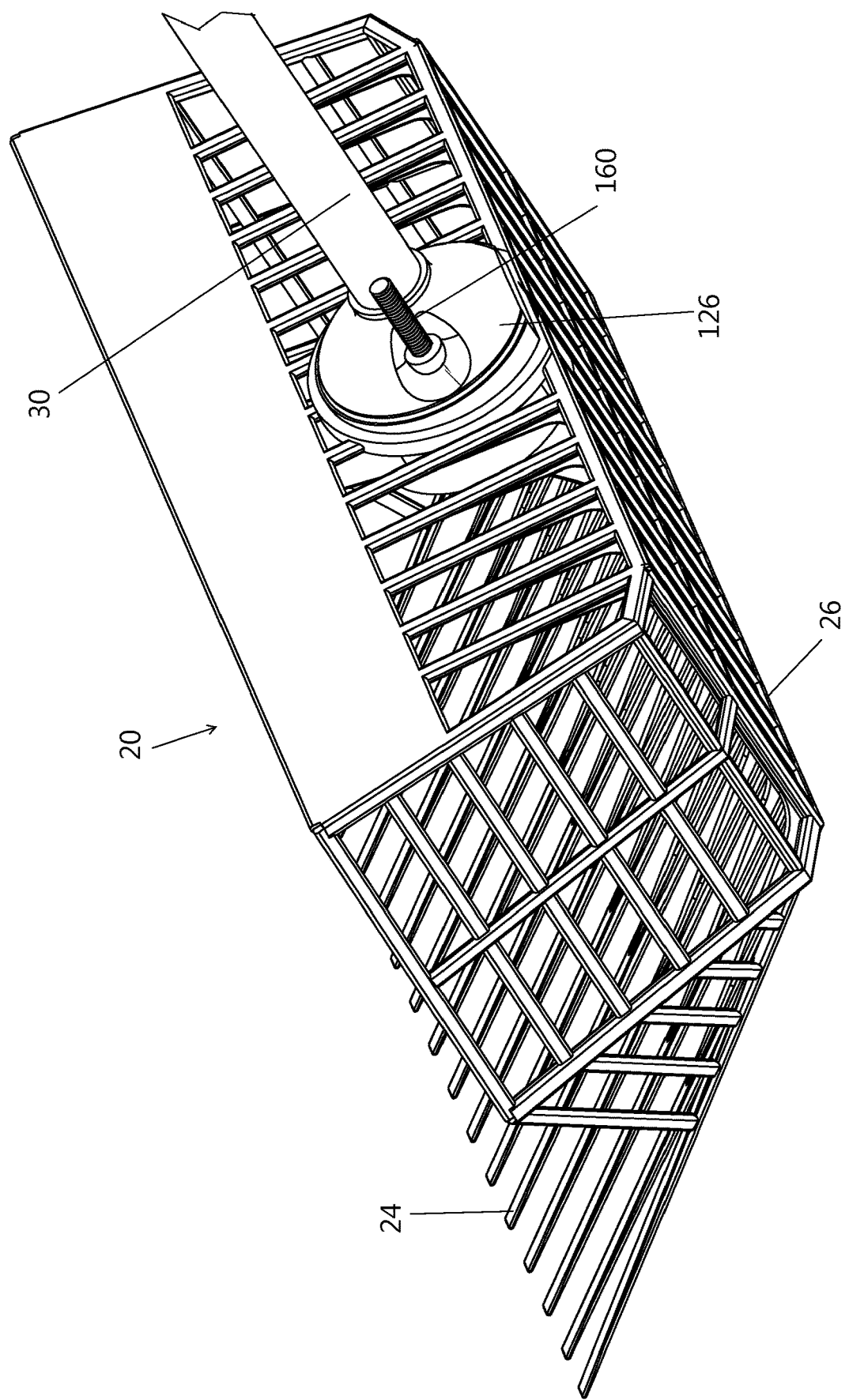
FIG. 6 is a partial sectional back perspective view of a waste receptacle or scoop in accordance with an embodiment of the invention.
Figure 7:
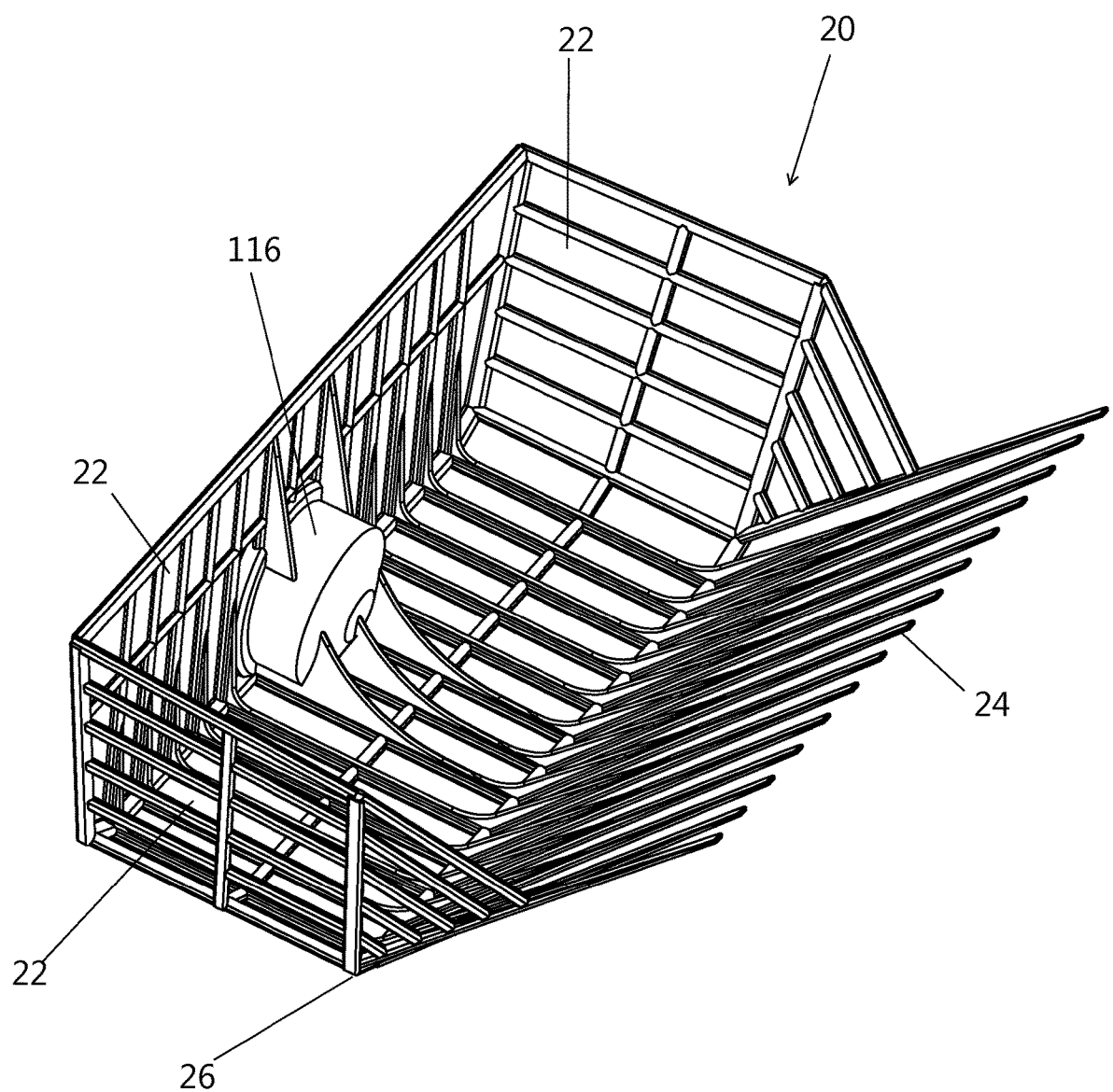
FIG. 7 is a partial sectional front perspective view of a waste receptacle or scoop in accordance with an embodiment of the invention.
Figure 8:
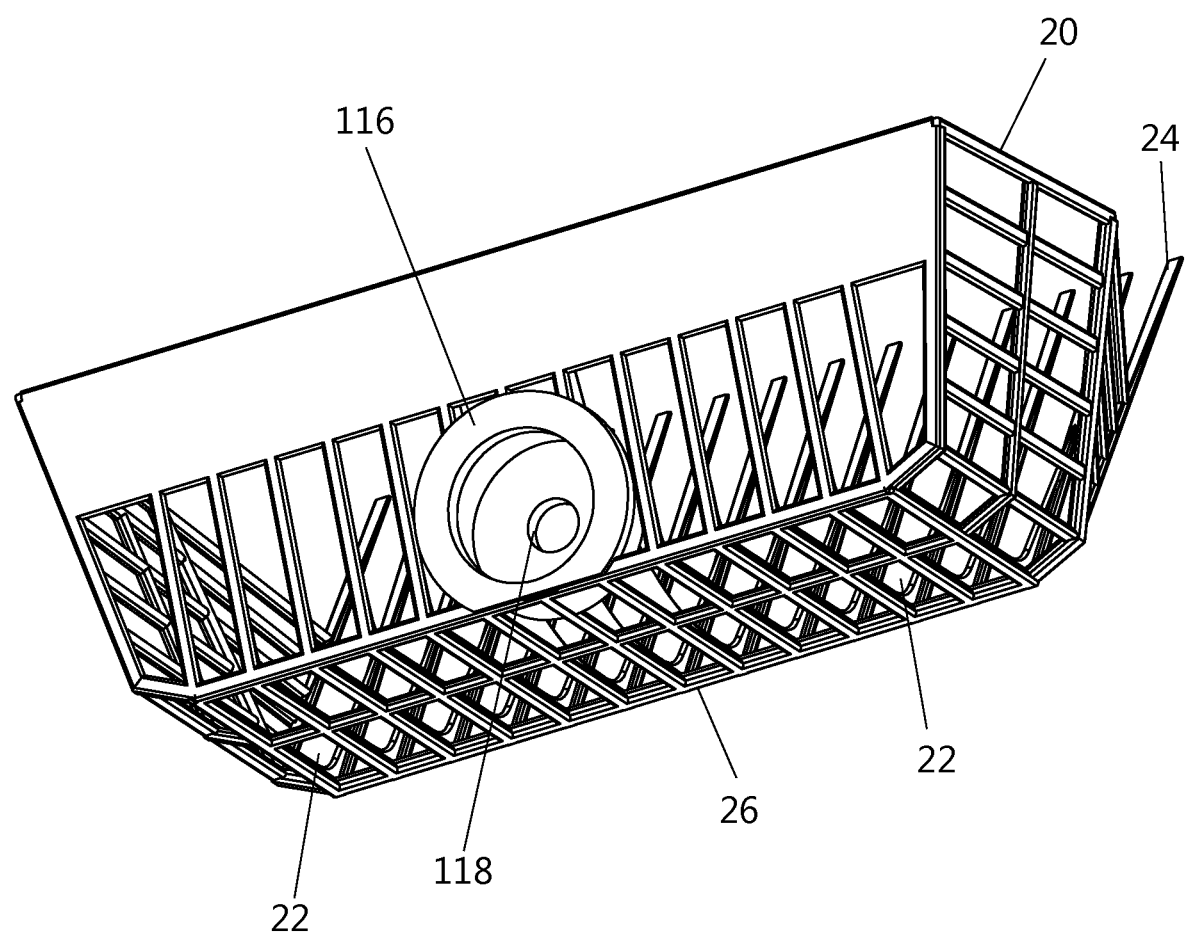
FIG. 8 is a partial sectional back perspective view of a waste receptacle or scoop in accordance with an embodiment of the invention.
Figure 9:
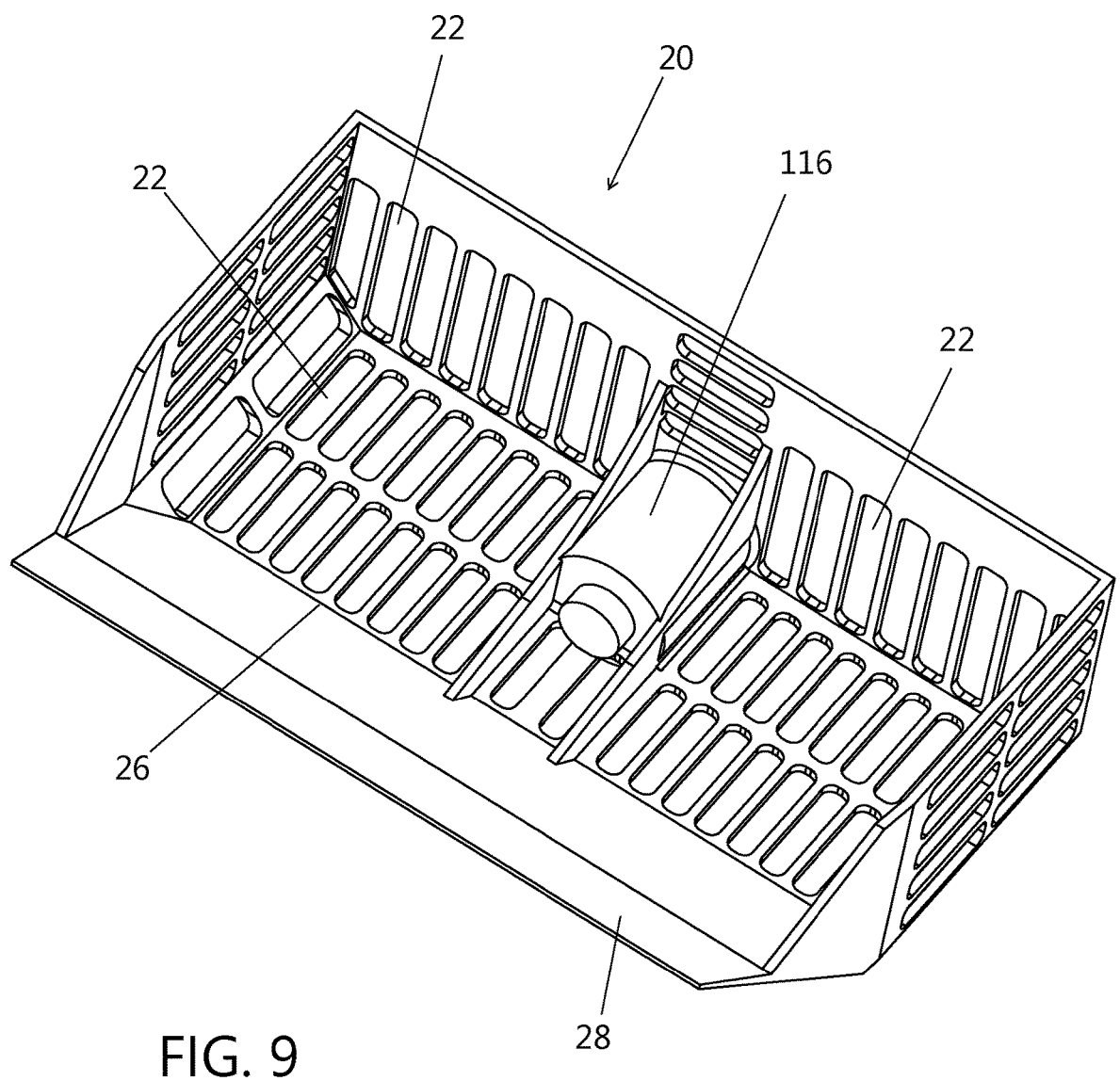
FIG. 9 is a partial sectional front perspective view of a waste receptacle or scoop in accordance with an embodiment of the invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The manure rake 10 of the present invention generally includes a manure basket, receptacle, or scoop 20, a handle 30, an ergonomic grip 40, a second ergonomic grip 60, a motor 70, a drive shaft 80 and shaker assembly 100. In various embodiments depicted in the Figures the invention is illustrated including a manure rake 10 that has a shaker assembly 100 driven by a variable speed motor 70. The shaker assembly 100 causes the rake 10 to oscillate in three dimensions rather than two dimensions. More specifically, the shaker assembly 100 creates a vibration that resonates through the manure basket 20 and also creates a disruptive intermittent perturbation that shakes the basket 20.

With reference to the Figures, the waste removal tool 10 is described in greater detail. FIGS. 1-4 illustrate an embodiment of the assembled manure rake 10. The manure rake 10 includes a manure basket, receptacle, or scoop 20, a handle 30, an ergonomic hand grip 40, a second ergonomic hand grip 60, a motor 70, a drive shaft 80 and shaker assembly 100. The manure basket or waste receptacle 20 has a forward facing edge 26 defining an opening into the basket 20. The forward facing edge 26 may be further defined by tines 24 extending at an angle from the basket. The angle of the tines 24 may be defined so that the bottoms of the tines rests upon a floor and the handle then extends upward at an angle from the floor. The chosen angle that the tines extend from the basket will determine the steepness that the handle extends upward from the floor when the bottom of the tines engage the floor.

The handle 30 includes a sheath 32 having a hollow interior and drive shaft 80 extending through the hollow interior of the sheath 32. A first end 34 of the handle 30 is fixed to the receptacle 20 and a second end 36 of the handle is fixed to a first hand grip 40. The first hand grip 40 includes a palm grip 42 and a void or hole extending through the grip 40 that provides a finger hold 44 on a bottom portion of the palm grip 42. The first hand grip 40 is further integrated with motor 70. A lengthwise axis 46 of the palm grip 42 is aligned parallel with the lengthwise axis 38 of the handle 30. In this manner a pushing against the palm grip translates most efficiently to move the basket 20 forward. The second hand grip 60 includes an adjustable clamp 62 that fastens the second hand grip 60 to the handle 30. The position of the second hand grip along the handle may be varied dependent upon user preference. By way of example, the handle position may be adjusted dependent upon the height of a user or, alternatively, the second hand grip may be adjusted along the handle to be positioned approximate the center of mass of the rake 10. The second hand grip 60 includes a palm grip 64 and hand hold 66. A lengthwise axis 68 of the palm grip 64 is aligned approximately perpendicular to the lengthwise axis 38 of the first hand grip 40. Further, the second hand grip is fixed to the sheath 32 of the handle 30 between the first end 34 of the handle and the second end 36 of the handle. In this manner a user may more effectively and ergonomically lift the rake 10 upward.

As will be described in greater detail below, the low voltage motor 70 is housed and formed integral with the first hand grip 40. The motor 70 is coupled to a first end portion 84 of the drive shaft, wherein the drive shaft 80 extends through the hollow portion of the handle 30. The opposing end or second end portion 86 of the drive shaft 80 is coupled with the shaker assembly 100. The external portion of the shaker assembly 100 includes a housing 110, waste receptacle end cap 116, and handle end cap 126.

FIGS. 5-9 illustrates embodiments of the manure basket 20 in greater detail. The basket 20 may include openings or slots 22 extending through the bottoms and sides. The length and width of the slots 22 may be sized large enough to allow manure to pass through the slots 22 but small enough so that straw or wood chips remain in the basket. Alternatively, the width of the slots may be decreased and the length increased such that the manure is trapped within the basket but the straw vibrates and is able to fall through the slots. The rake includes sides and a back that restricts the manure from vibrating out of basket 20. The tines 24 help scoop and sift the manure and bedding material. In an alternative embodiment illustrated in FIG. 9, the tines 24 are replaced with a scraper 28. The scraper may be utilized to scrape everything off stall floor and into the basket 20. The waste receptacle end cap 116 may be formed or incorporated into the manure basket or receptacle 20. Those skilled in the art will appreciate that the bucket, tines and scraper may be constructed from several desirable materials using known methods of construction including die stamping, sheet metal formation, and plastic molding.

Figure 10:
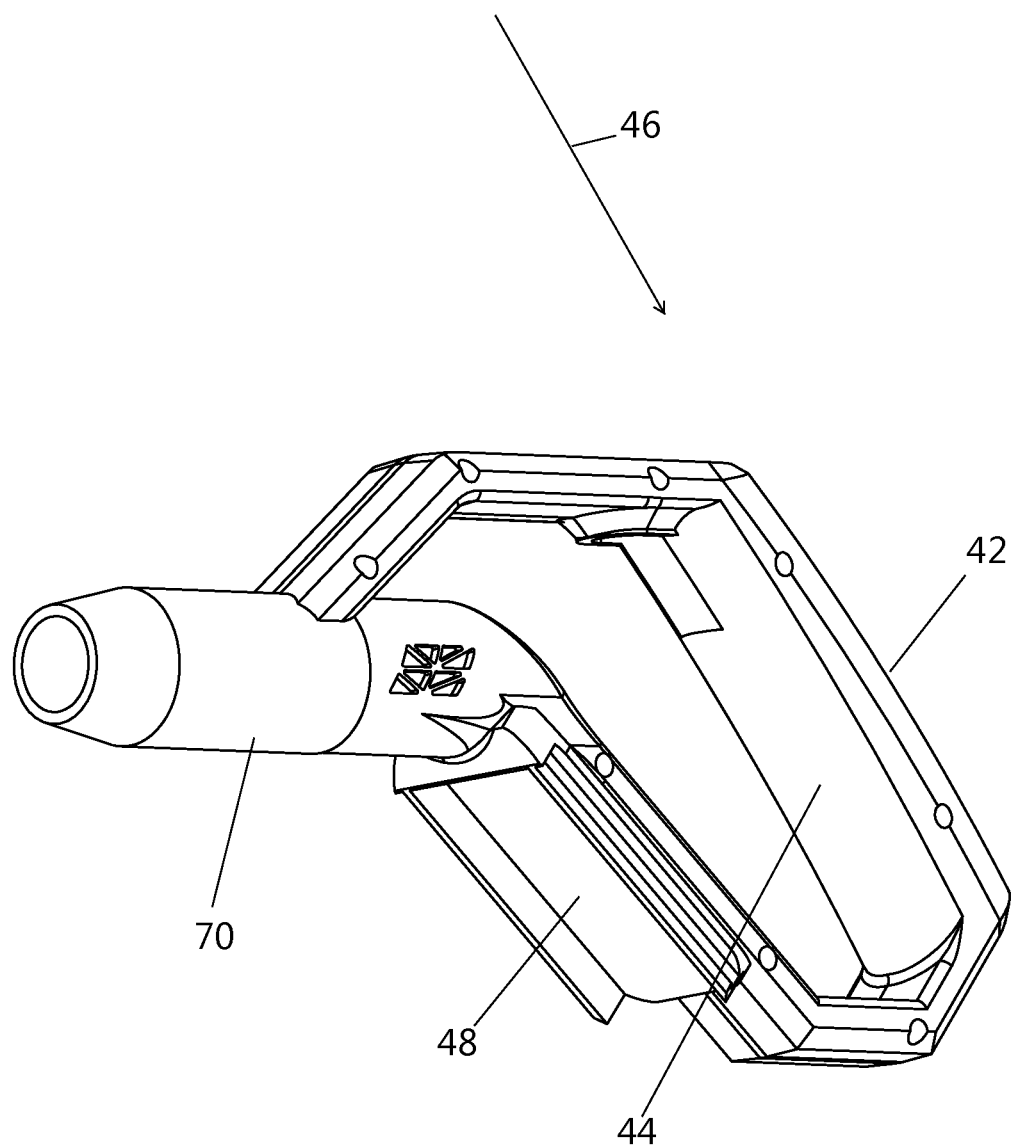
FIG. 10 is a front right perspective view of a hand grip in accordance with an embodiment of the invention.
Figure 11:
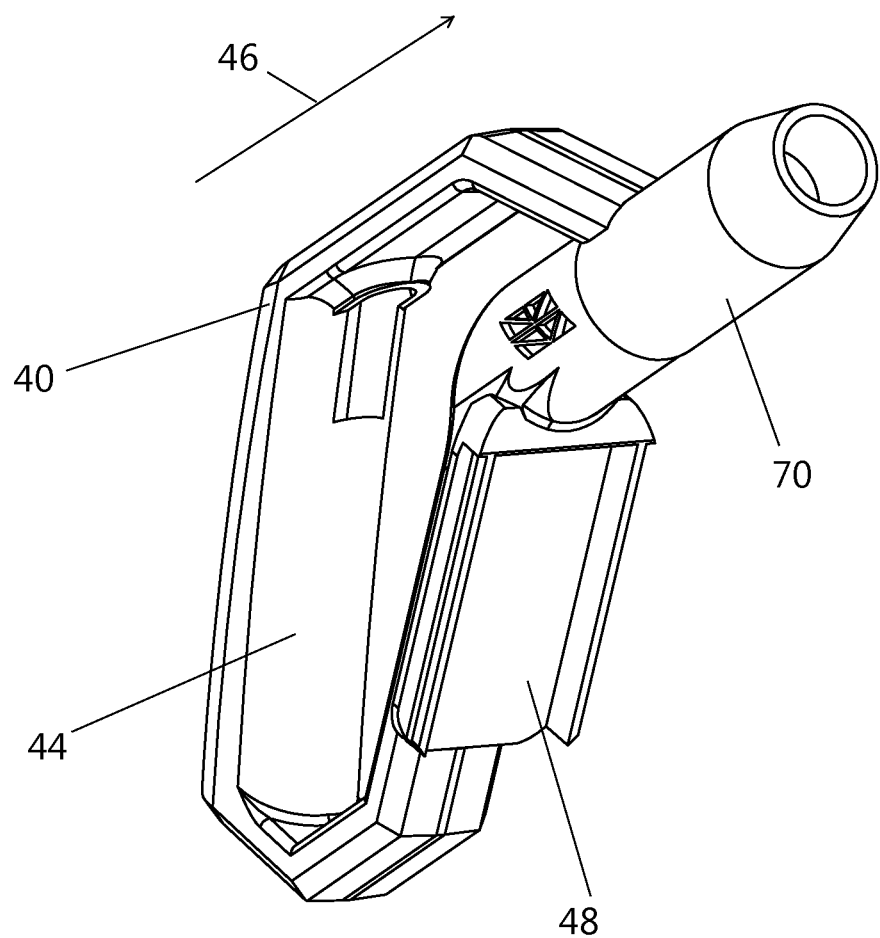
FIG. 11 is a front left perspective view of a hand grip in accordance with an embodiment of the invention.
Figure 12:
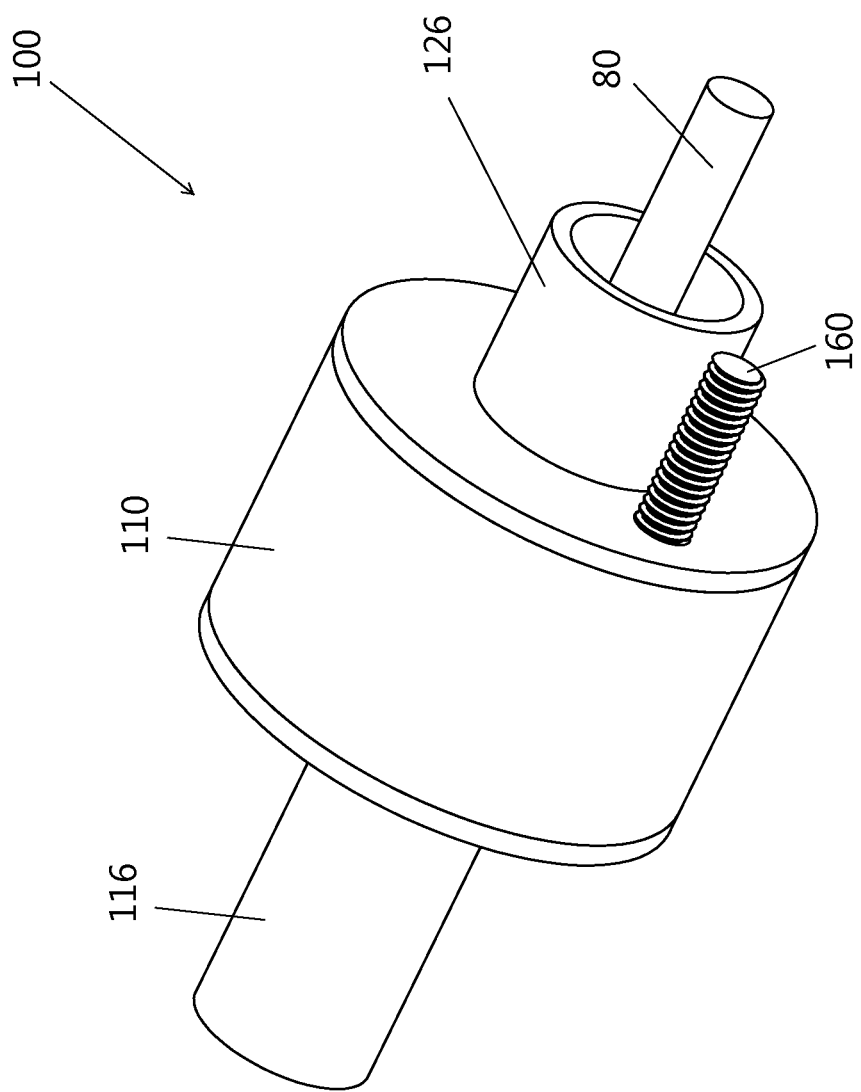
FIG. 12 is a perspective view of a shaker assembly in accordance with an embodiment of the invention.
Figure 13:
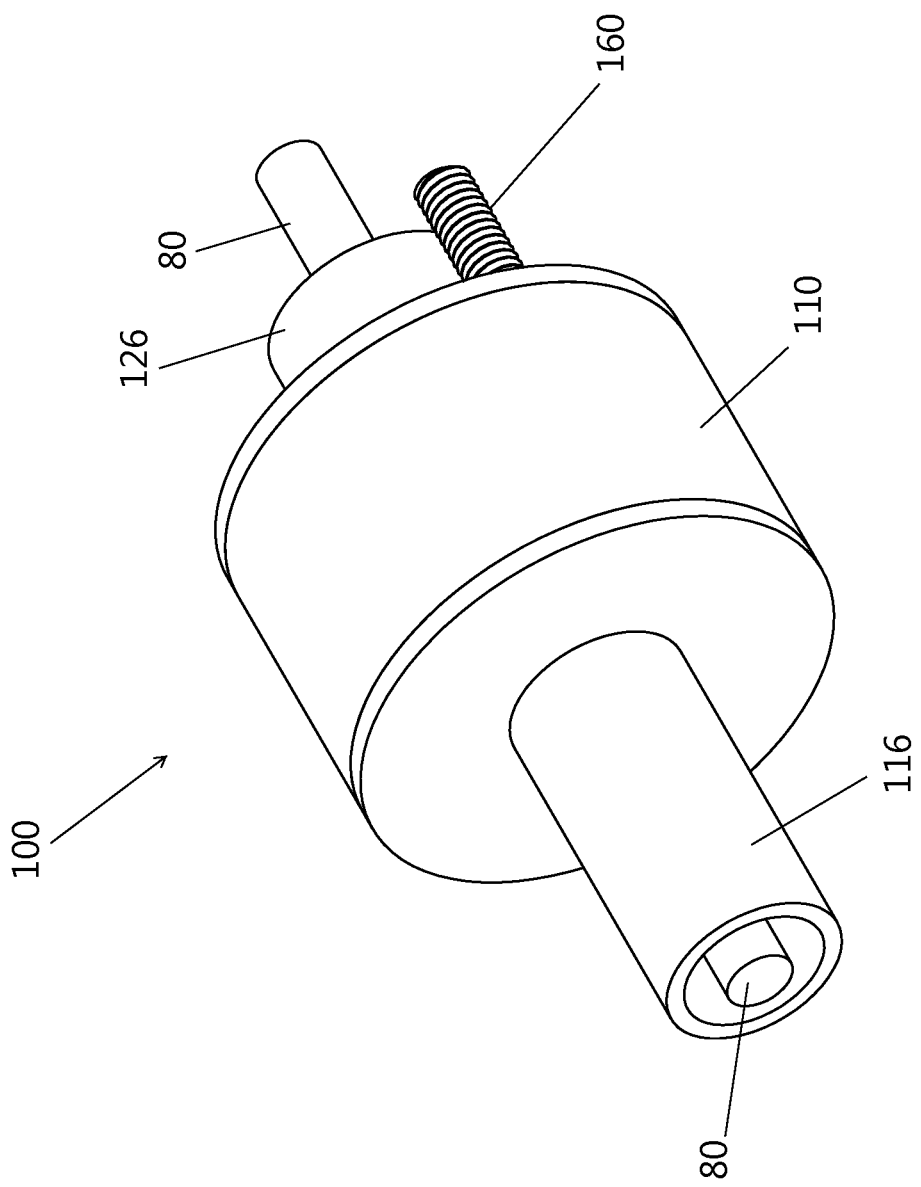
FIG. 13 is a perspective view of a shaker assembly in accordance with an embodiment of the invention.
Figure 14:
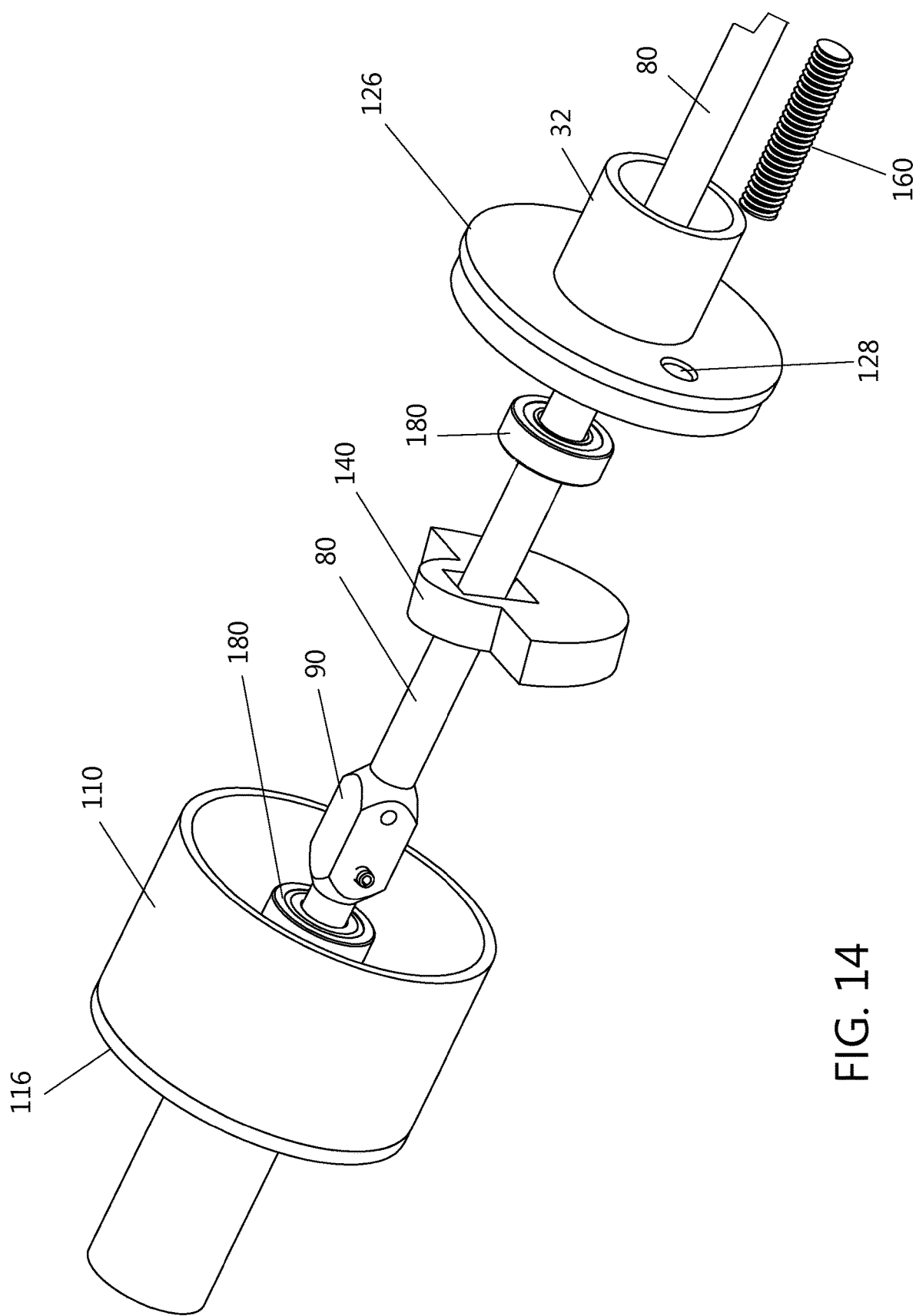
FIG. 14 is a partial sectional exploded perspective view of a shaker assembly in accordance with an embodiment of the invention.
Figure 15:
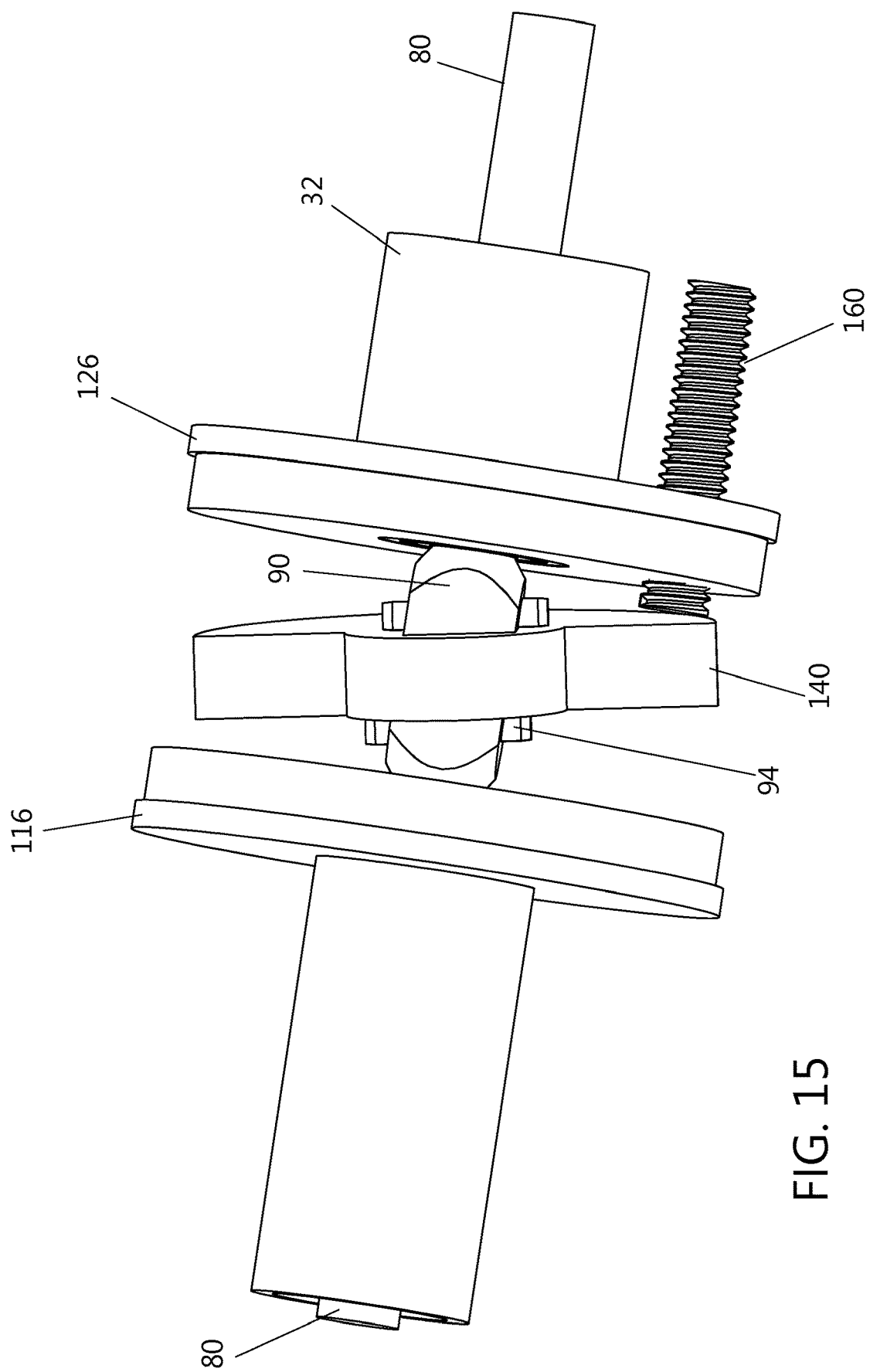
FIG. 15 is a perspective view of a partially assembled shaker assembly in accordance with an embodiment of the invention.
Figure 16:
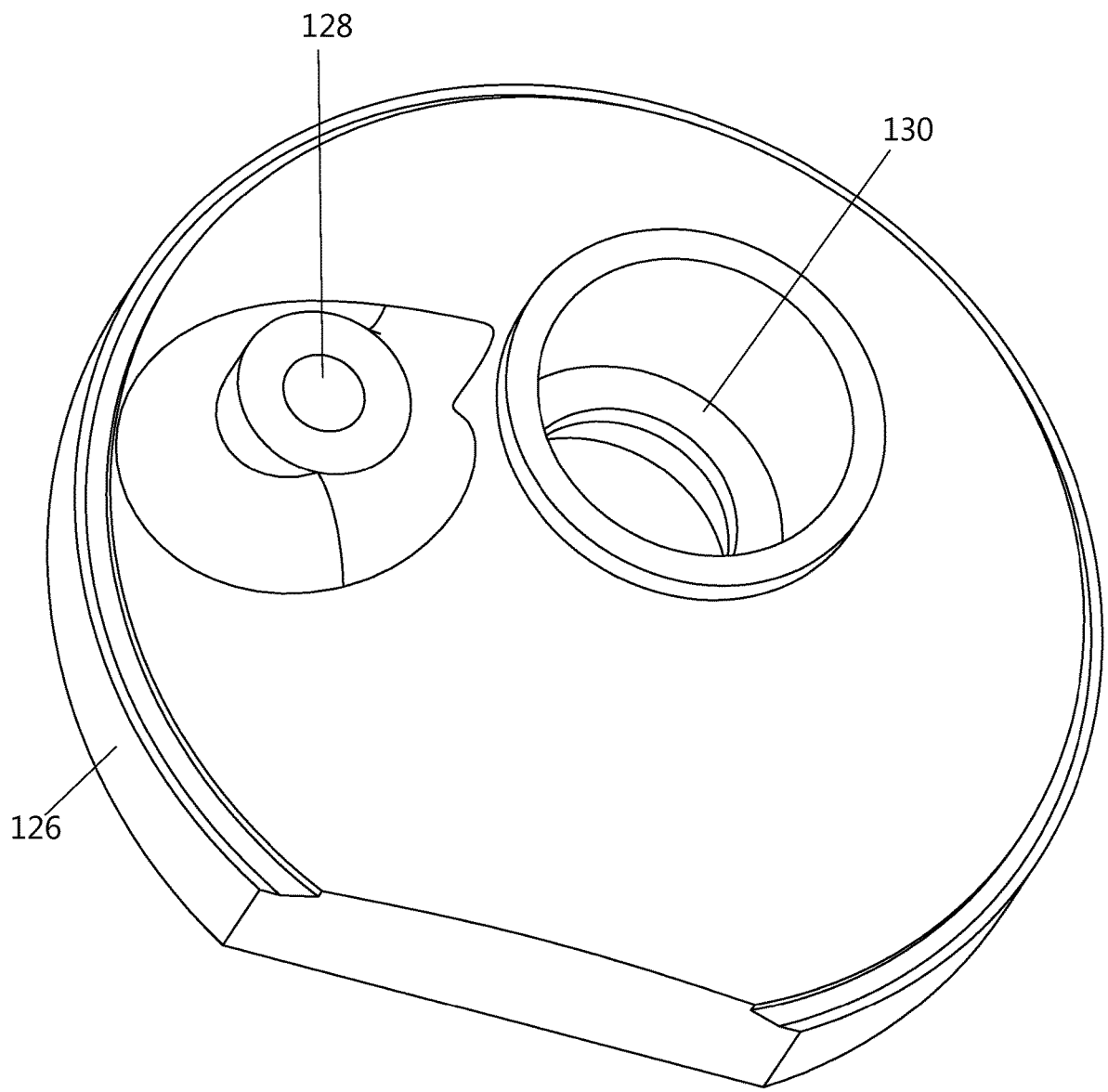
FIG. 16 is a front perspective view of a handle end cap of the shaker assembly in accordance with an embodiment of the invention.
Figure 17:
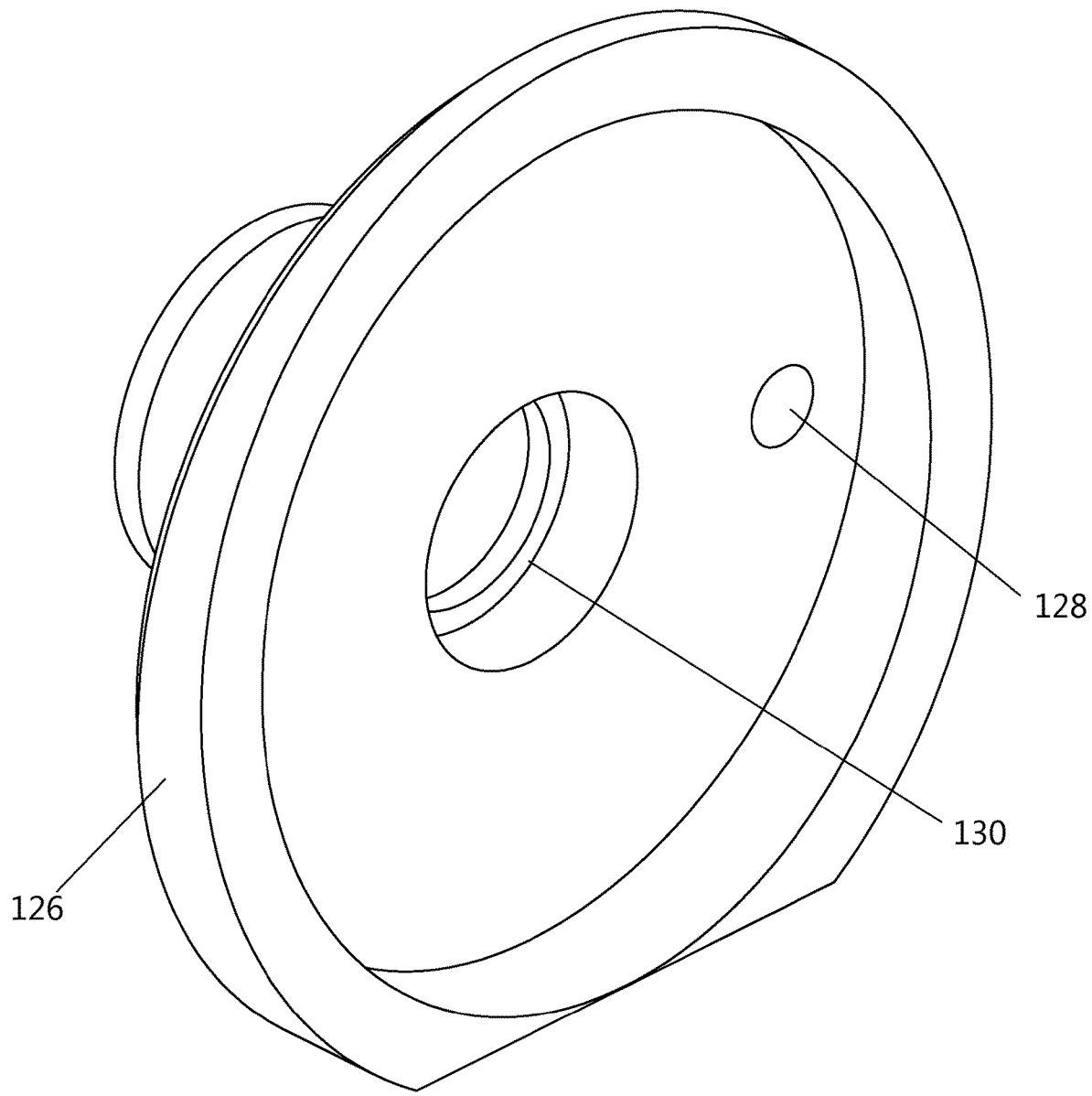
FIG. 17 is a back perspective view of the handle end cap of the type shown in FIG. 16.
Figure 18:
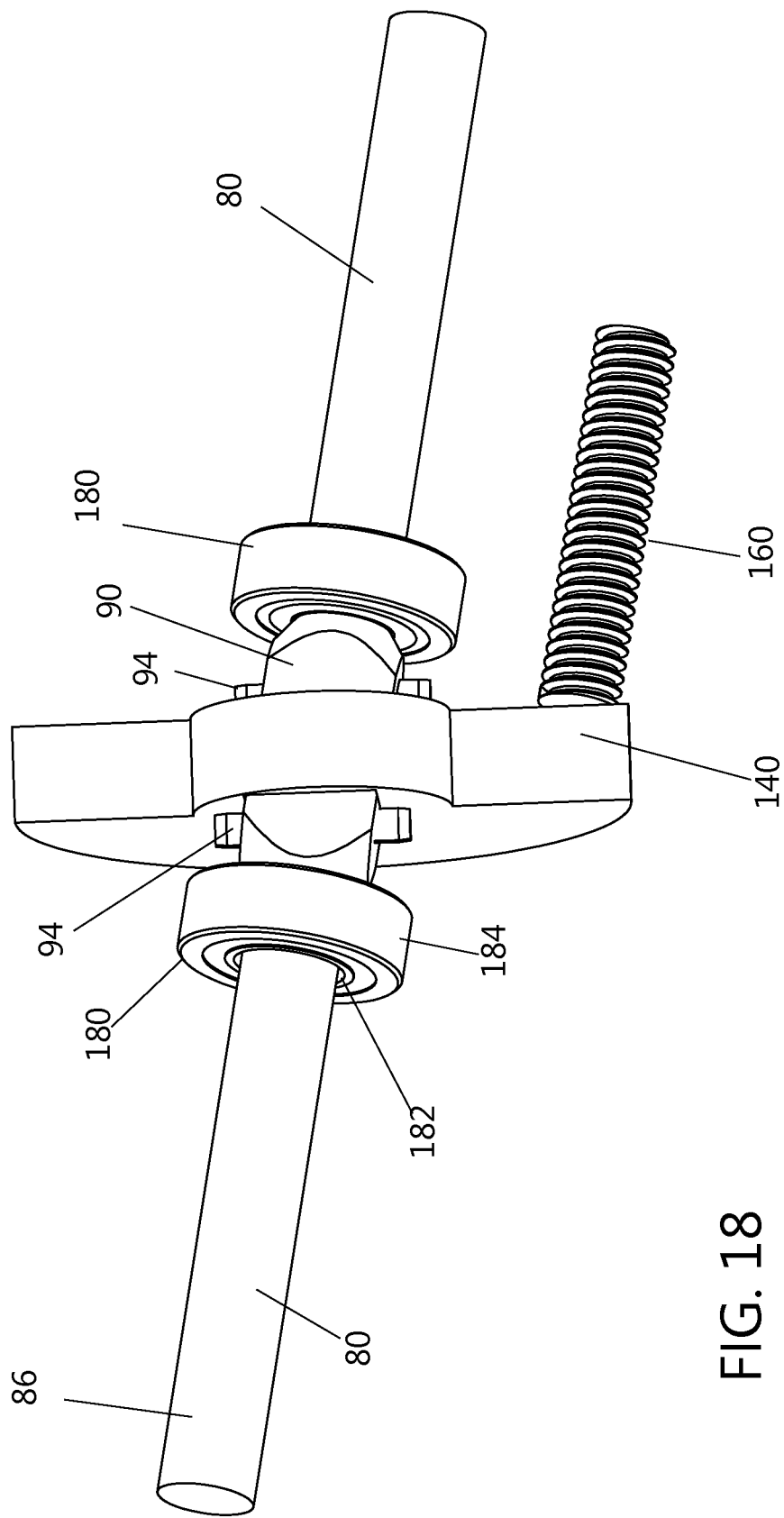
FIG. 18 is a perspective view of a partially assembled shaker assembly showing the position of the rubbing block when in contact with the eccentric weight in accordance with an embodiment of the invention.
Figure 19:
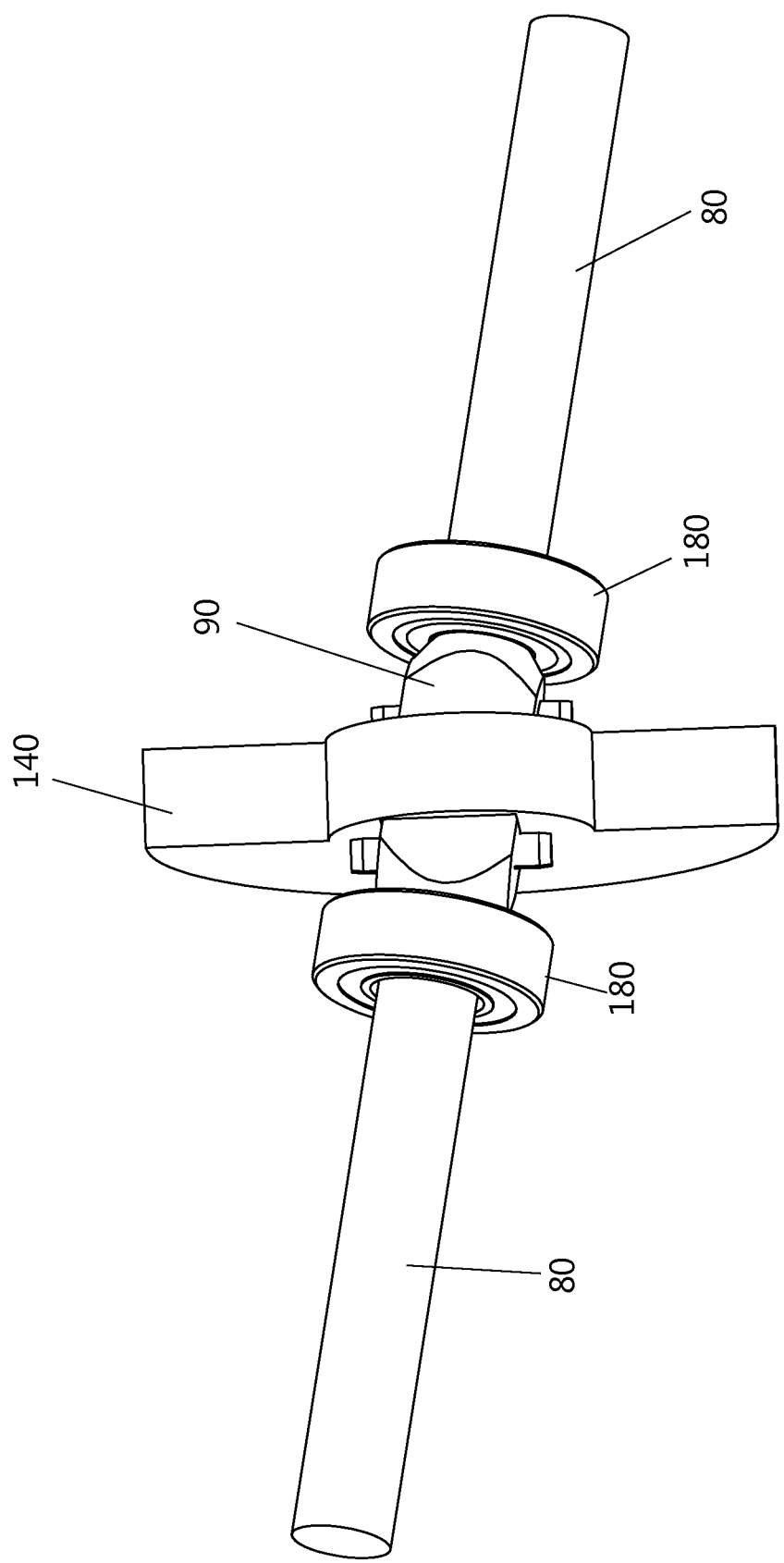
FIG. 19 is a perspective view of a partially assembled shaker assembly in accordance with an embodiment of the invention.
Figure 20:
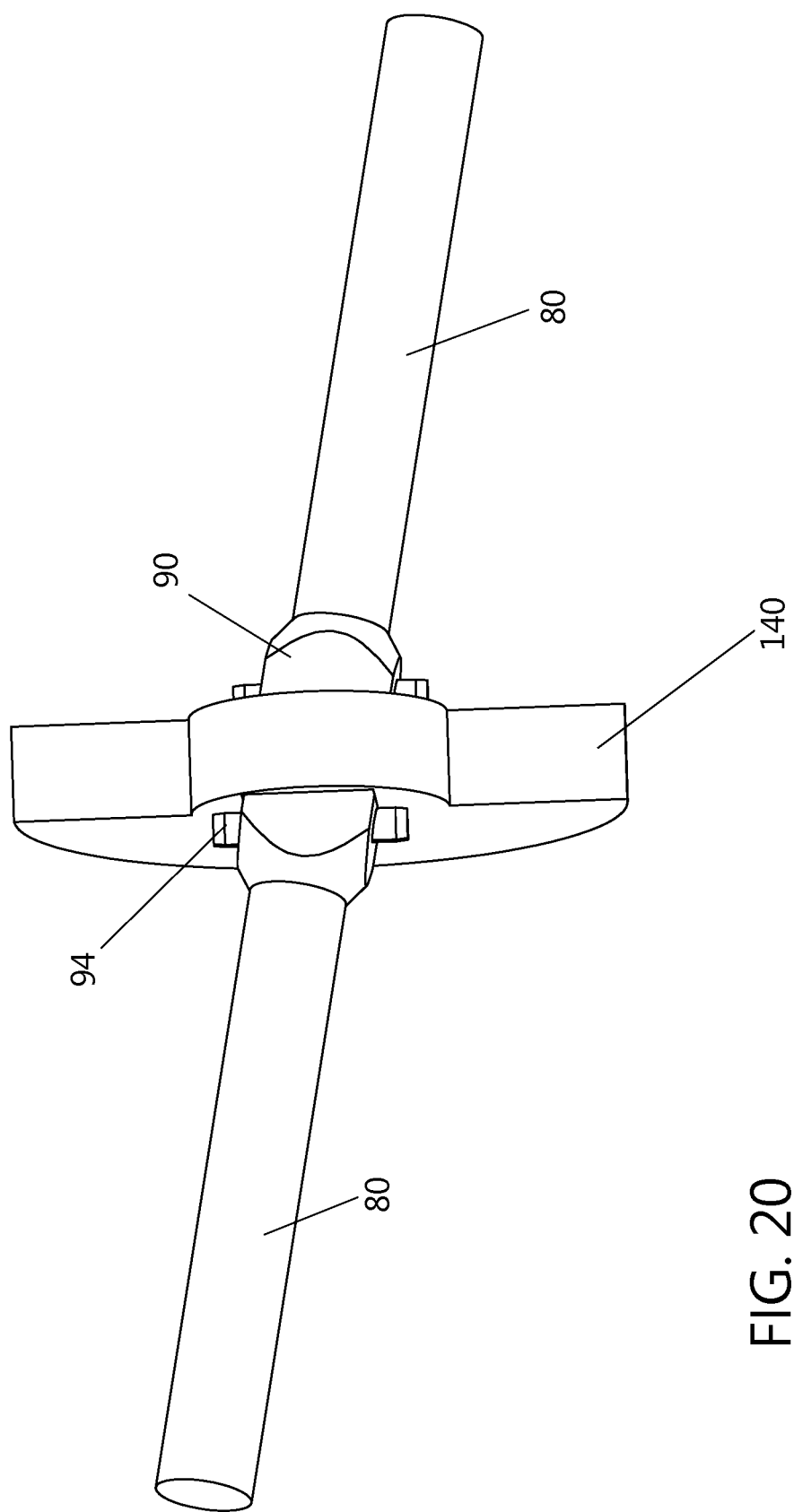
FIG. 20 is a perspective view of the partially assembled shaker assembly of the type shown in FIG. 19 and having the bearings removed.
Figure 21:
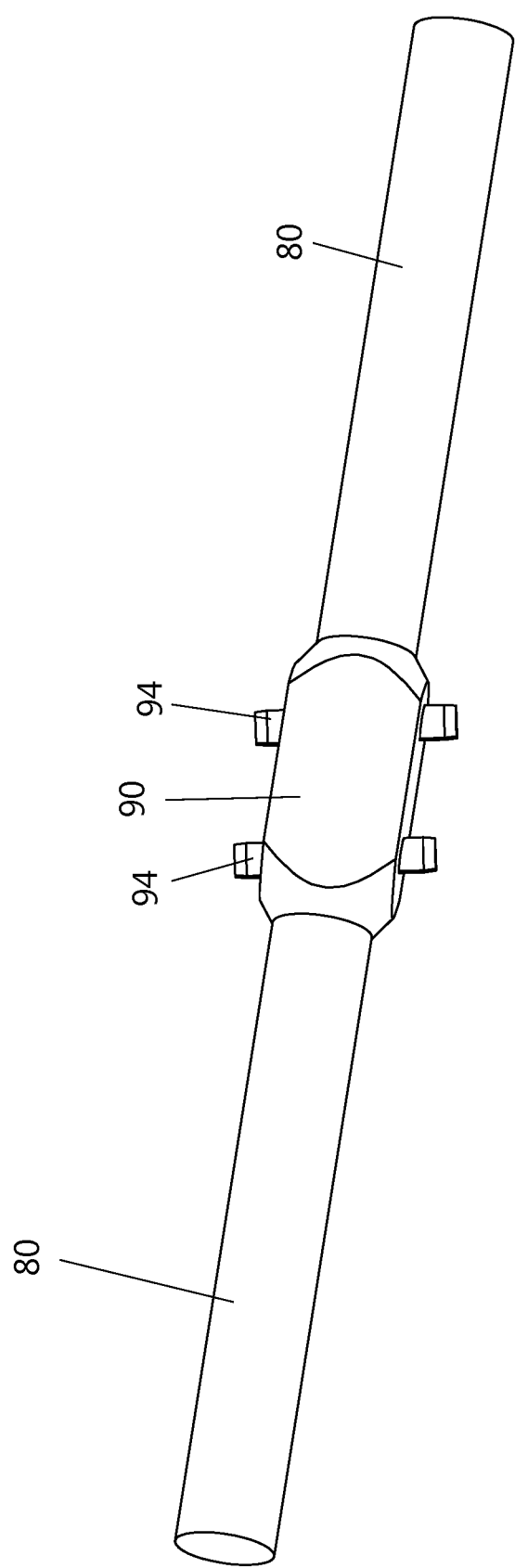
FIG. 21 is a partial sectional perspective view of a drive shaft of the shaker assembly of an embodiment of the invention.
Figure 22:
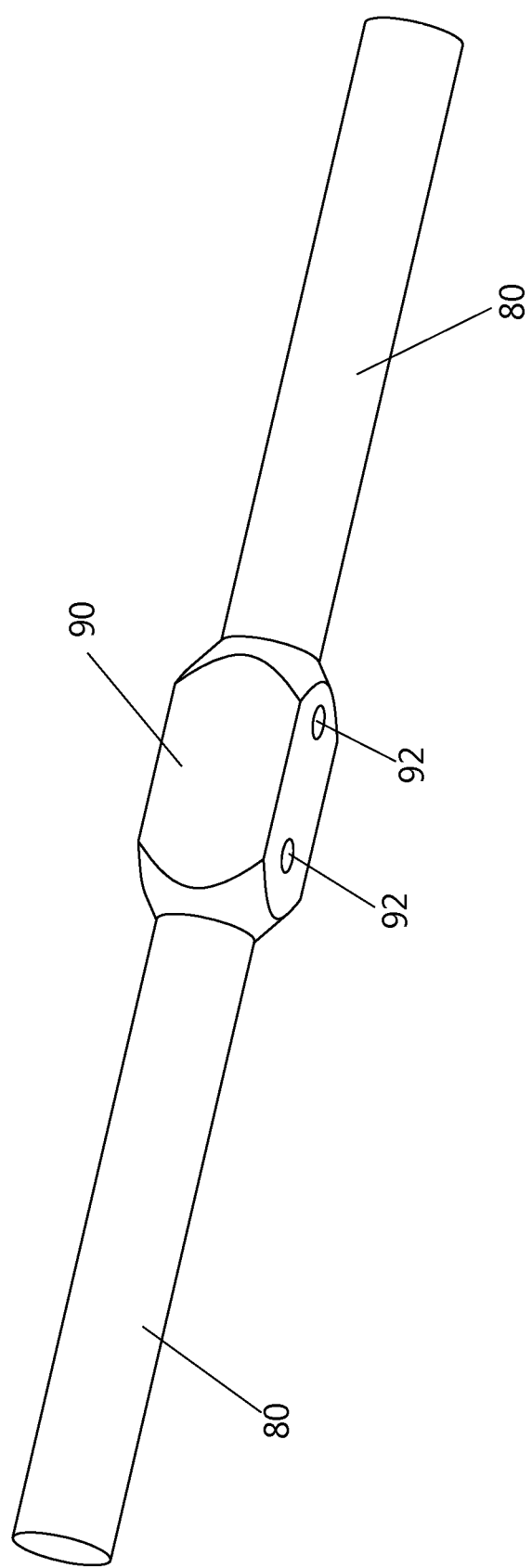
FIG. 22 is a partial sectional perspective view of the drive shaft of the type shown in FIG. 21 and having the split pins removed.
Figure 23:
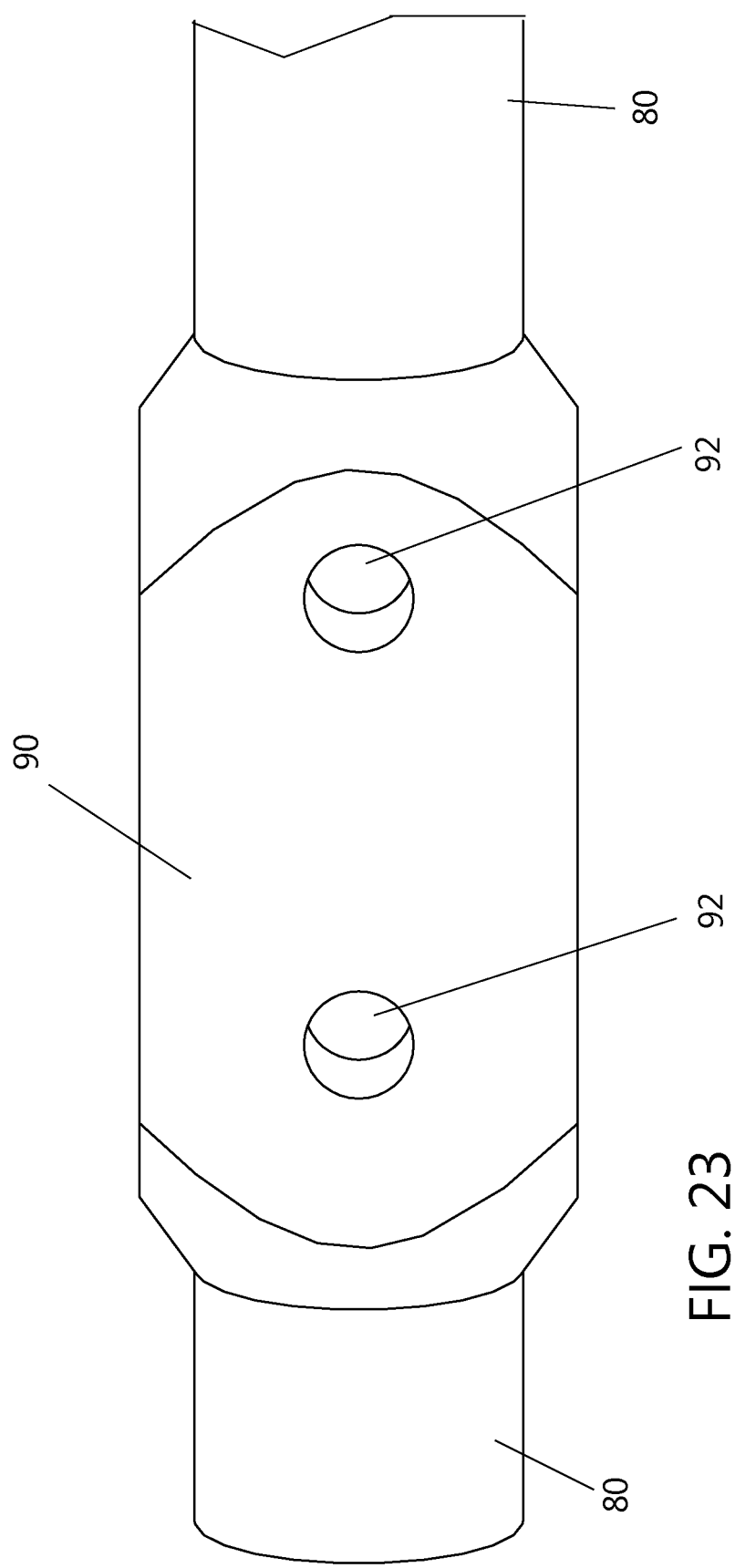
FIG. 23 is a partial sectional side view of the coupling of the drive shaft of the type shown in FIG. 22.
Figure 24:
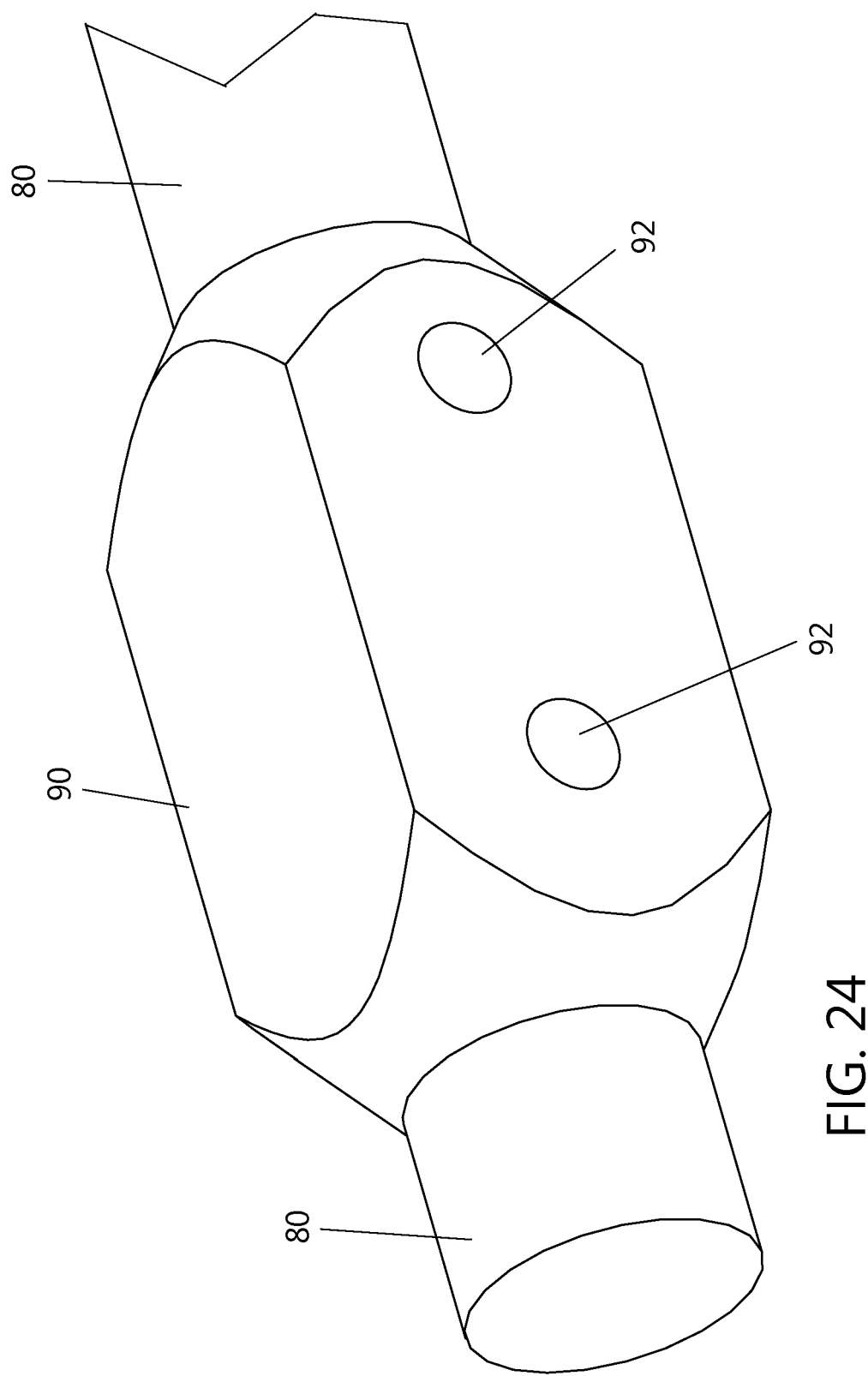
FIG. 24 is a partial sectional perspective view of the coupling of the drive shaft of the type shown in FIG. 23.
Figure 25:
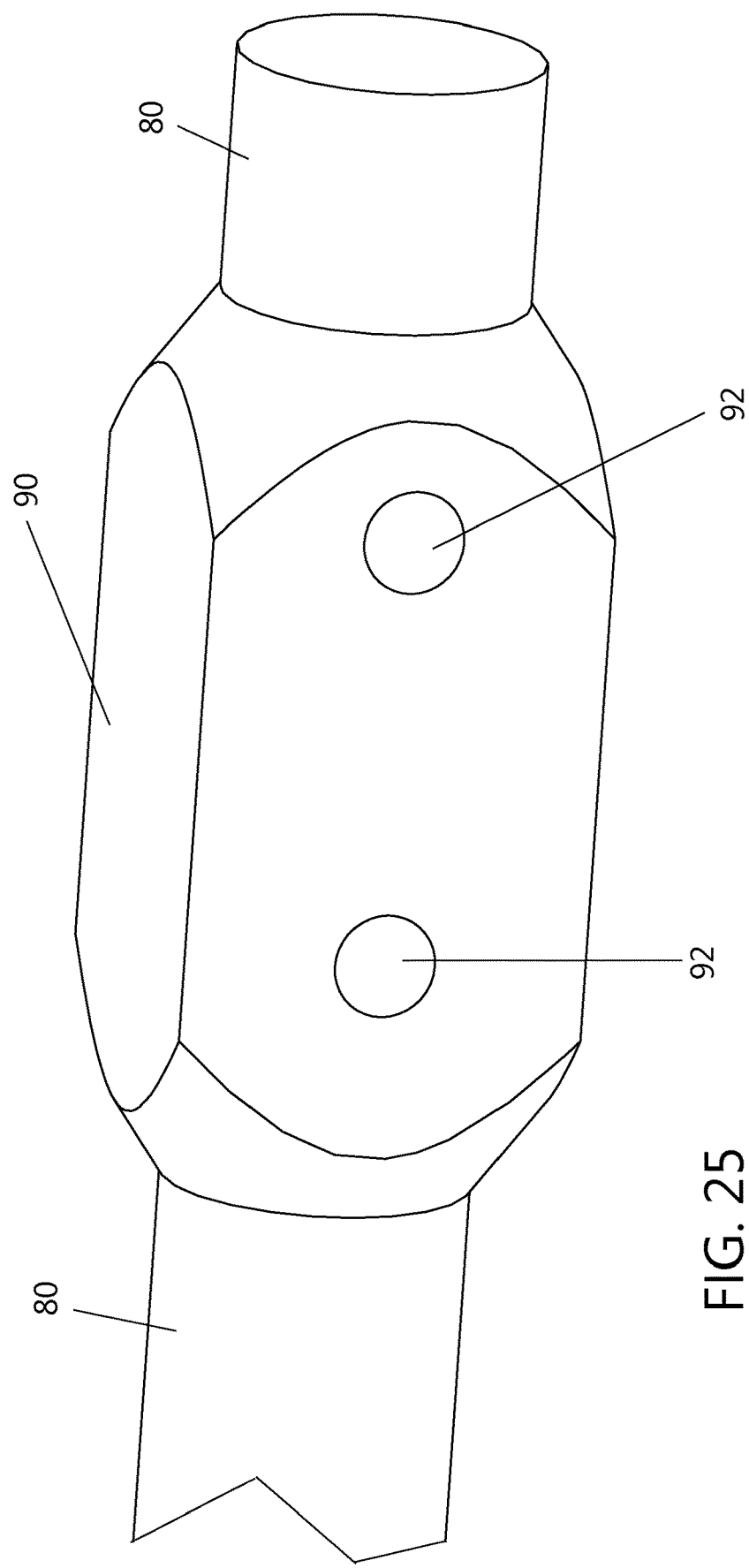
FIG. 25 is an opposing perspective view of the coupling of the drive shaft of the type shown in FIG. 24.
Figure 26:
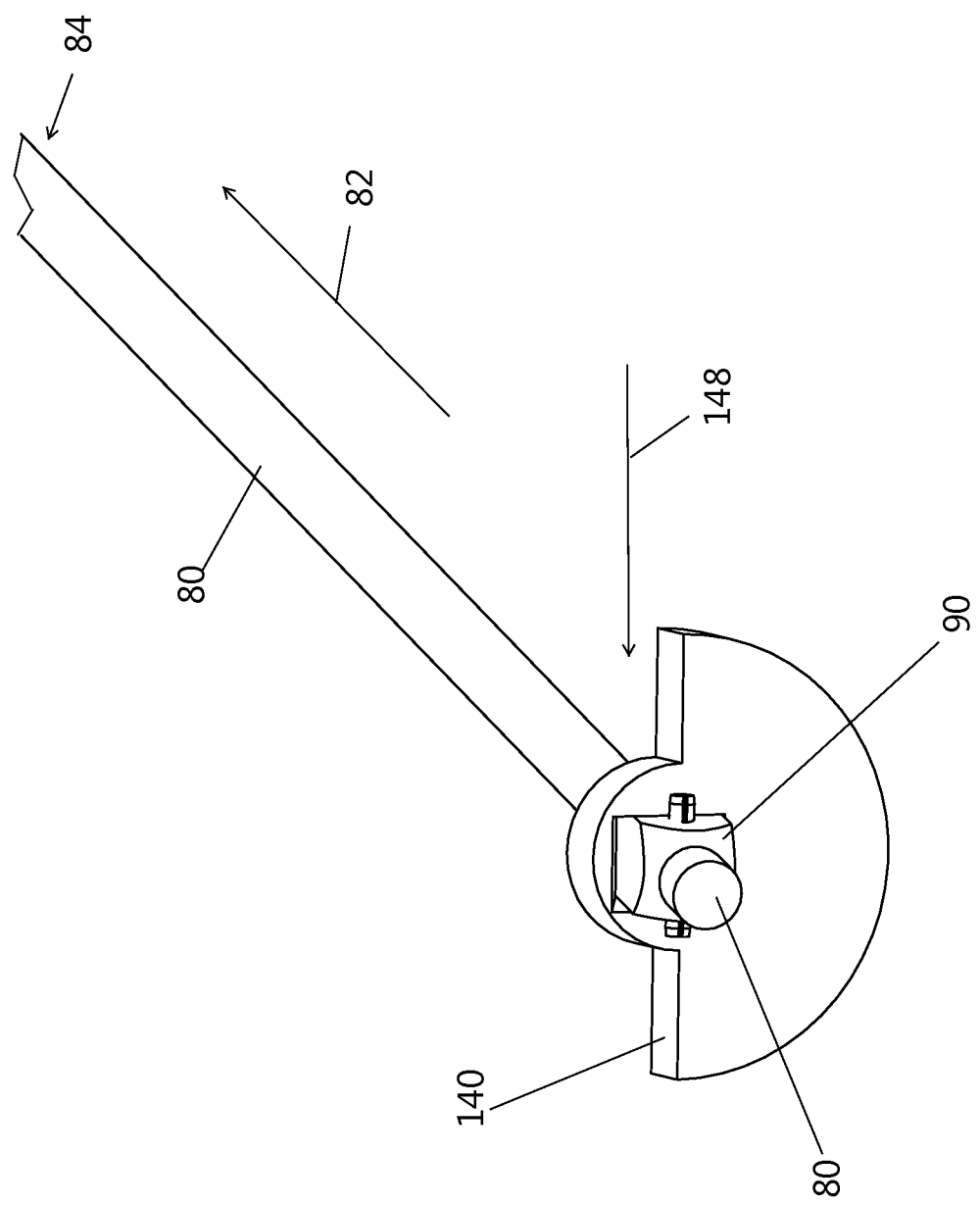
FIG. 26 is a partial sectional perspective view of the eccentric weight coupled to the drive shaft in accordance with an embodiment of the invention.
Figure 27:
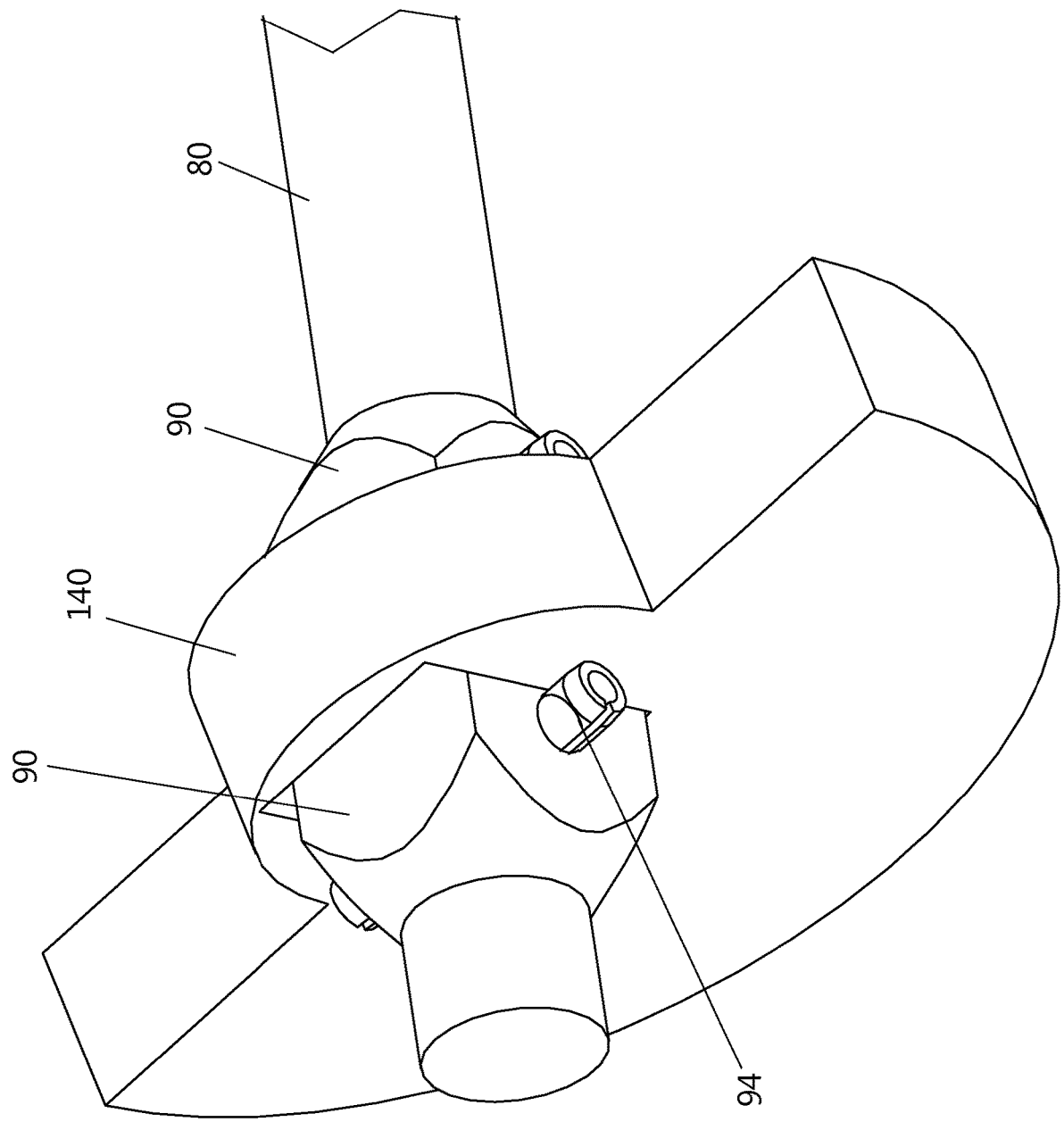
FIG. 27 is a partial sectional perspective view of the eccentric weight coupled to the drive shaft in accordance with an embodiment of the invention.
Figure 28:
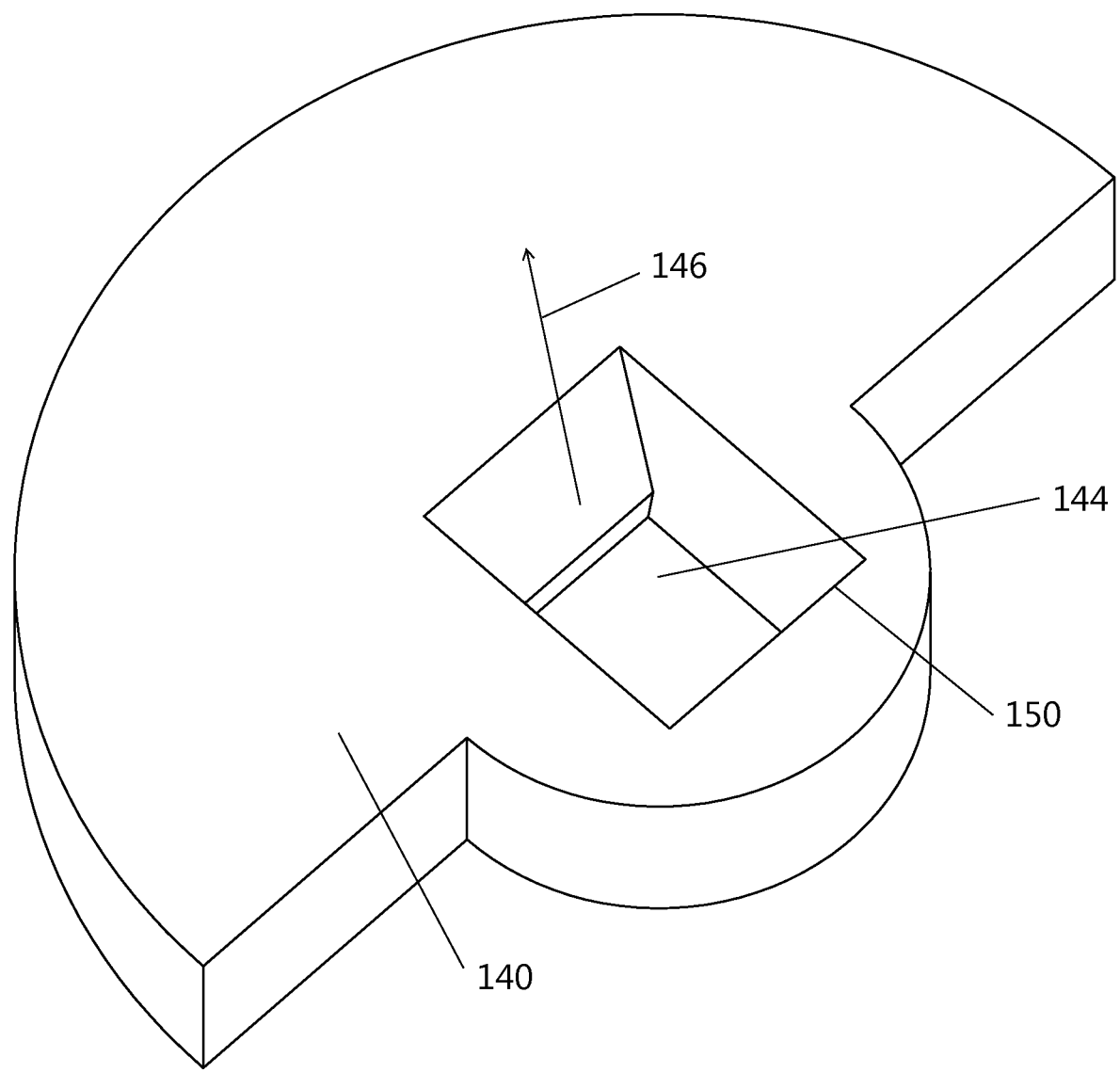
FIG. 28 is a top perspective view of an eccentric weight in accordance with an embodiment of the invention.
Figure 29:
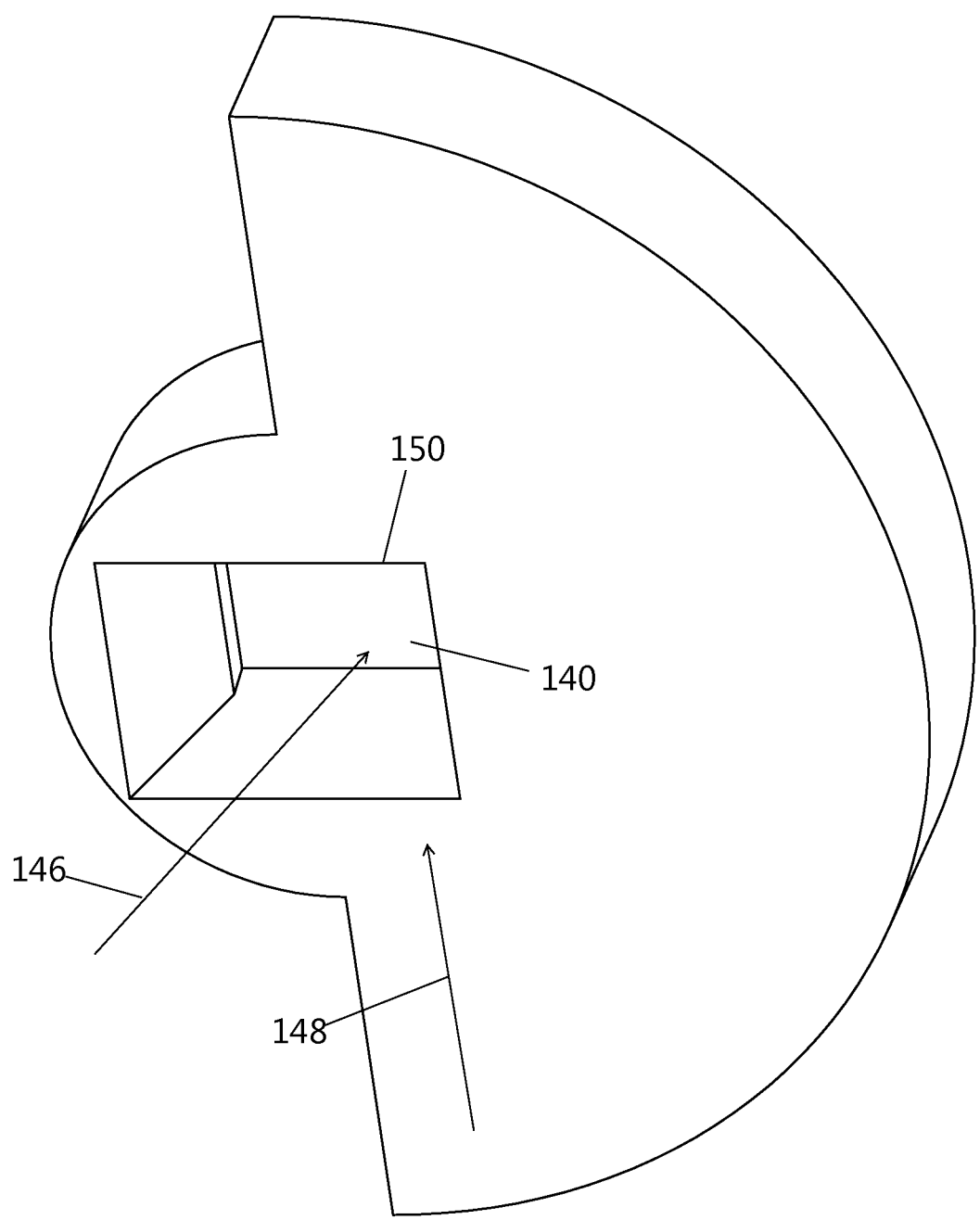
FIG. 29 is a bottom perspective view of the eccentric weight of the type shown in FIG. 28.

FIGS. 10-11 illustrates a portion of the ergonomic hand grip 40 that includes the low voltage, battery powered motor 70 incorporated into the hand grip 40. The hand grip and motor housing includes a dock, coupling or connector 48 to which a battery is secured and to which the battery is electrically coupled to the low voltage rotary motor 70 by known suitable means and construction. The rotary motor 70 is coupled to a first end portion 84 of the drive shaft 80. The rotary motor 70 may be of a variable speed type and may further be of a cordless type. The cordless motor 70 may be of a certain known voltage and amperage type motor capable of rotating the drive shaft 80 and eccentric weight 140 at a rate ranging between 850 and 950 revolutions per minute. Further the motor of known suitable construction may include a gearing to reduce rpm at start up and to decrease noise as the eccentric weight begins to spin. A power switch or trigger and gearing selector switch may be coupled to the motor and incorporated into the motor housing and hand grip 40. Those skilled in the art will further appreciate that a lower revolutions per minute reduces vibration and the amount of potential dust created by vibrating manure basket.

FIGS. 12-17 illustrates portions of the shaker assembly 100. An embodiment of the shaker assembly 100 includes a housing 110, waste receptacle end cap 116, handle end cap 126, and an eccentric weight 140. Drive shaft 80 extends through the handle end cap 126, housing 110 and waste receptacle end cap 116. The drive shaft 80 includes a coupler 90 that couples the shaft to an aperture 144 extending through the eccentric weight 140. An inner ring of ball bearings 180 engage to the drive shaft 80 and an outer ring 184 engages to bearing seats 118 and 130 formed in the basket end cap 116 and handle end cap 126 respectively. Use of the bearings 180 reduces noise from the spinning shaft and allows for an efficient rotation of the eccentric weight 140. A rubbing block 160 extends through a threaded bore 128 formed in the handle end cap 126. The amount the rubbing block extends into the handle end cap is adjustable. A nut may be used to tighten and hold in place the rubbing block relative to the end cap 126. The rubbing block 160 is arranged to contact the eccentric weight 140 once every full revolution of the eccentric weight. Those skilled in the art will appreciate that portions of the shaker assembly 100 may be incorporated into the rake basket 20. Alternatively, the shaker assembly 100, drive shaft 80 and motor 70 may be retrofitted and secured to the lower portion of an existing manure rake, pitch fork, shovel or other barn tool.

FIGS. 18-29 illustrates the coupling portion of the drive shaft 80, the eccentric weight 140, and the combination of the eccentric weight 140 coupled to a portion of the drive shaft 80. The coupler 90 includes apertures 92 extending through the coupler. The apertures are spaced apart a distance that is approximately equal to the width of the eccentric weight 140. The eccentric weight 140 includes an aperture 144 that is shaped to match the shape of the coupler 90. The eccentric weight is slid onto the coupler portion of the shaft and roll pins or spring pins 94 are press fit into the apertures 92 of the coupler 90. In this manner the eccentric weight 140 is held in place on the drive shaft 80. Eccentric weight 140 extends outward from the shaft but not at a perpendicular angle. The aperture 144 includes a central axis 146 that does not align parallel with the rotation axis of the shaft 80. Stated otherwise, the rotational plane of the eccentric weight is not perpendicular to the rotation axis of the shaft. In this manner the reduced angle between the axis of rotation of the shaft and the rotational plane of the eccentric block decreases the amps required by the motor to initially start the rotation of the eccentric weight by the motor. A compression spring biased plunger style tip insert or wear resistant plastic tip insert may be joined to the end of the rubbing block that contacts the eccentric weight. In this manner, the wear life cycle of the rubbing block may be increased.

FIGS. 26-29 illustrates the eccentric weight 140 and how the eccentric weight is coupled to the drive shaft 80 in greater detail. The aperture 144 extending through the eccentric weight has a square cross section 150 to match the outer shape of the coupler 90. Of course other mating shapes for the coupler 90 and aperture 144 could be utilized, however the square shape provides an efficient structure to lock the eccentric weight on the shaft without requiring a laborious alignment and keying mechanisms. The aperture 144 of the eccentric weight 140 extends through the eccentric weight such that a central axis 146 of the aperture 144 is not perpendicular to the rotational plane 148 of the weight. In this manner less torque is required to start the eccentric weight spinning. In other embodiments, the eccentric weight may have relief holes or slots extending through the eccentric weight to alter the center of mass outward toward an outer edge of the eccentric weight. The weight reduction of the eccentric weight reduces the amount of torque required to spin the weight. The change of the center of mass alters the vibration caused by spinning the weight.

In use, when cleaning a barn stall the hand grip 40 allows a user to effectively push the tines 24 under a pile of soiled bedding material. The user may then use the second grip 60 to scoop a portion of the soiled bedding by lift the rake 10 upward. The weight of the motor and weight of spoiled bedding counterbalance each other during the upward lift. The motor is then powered or engaged and the rotation of the motor translates to the drive shaft 80 and eccentric weight 140. The motor may be a variable speed so that the user may control the rate at which the drive shaft rotates. In this manner, the amount of vibration and shaking is controlled by the user. At times the user may wish to operate the vibration and shaking at a slow rate to reduce the amount of noise created by the vibration and shaking. At other times the user may desire to operate the vibration and shaking at maximum rate to quickly separate the manure and bedding materials.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A manure rake apparatus, said apparatus comprising:
   a waste receptacle having a forward facing edge defining an opening into the receptacle;
   a handle including a sheath having a hollow interior and drive shaft extending through the hollow interior of the sheath, wherein a first end of the handle is fixed to the receptacle and a second end of the handle is fixed to a first hand grip;

a second hand grip fixed to the sheath of the handle between the first end of the handle and the second end of the handle;

a rotary motor coupled to a first end portion of the drive shaft;

a shaker assembly including a housing, waste receptacle end cap, handle end cap, and an eccentric weight, wherein the drive shaft extends through the handle end cap, housing and waste receptacle end cap and further wherein the drive shaft includes a coupler that couples the shaft to an aperture extending through the eccentric weight; and wherein the aperture of the eccentric weight extends through the eccentric weight such that a central axis of the aperture is not perpendicular to the rotational plane of the weight.

2. The apparatus as recited in claim 1, further including a rubbing block extending from the handle end cap and arranged to contact the eccentric weight once every full revolution of the eccentric weight.

3. The apparatus as recited in claim 1, further including ball bearings engaged to the shaker assembly and the drive shaft.

4. The apparatus as recited in claim 1, wherein the rotary motor is of a variable speed type.

5. The apparatus as recited in claim 4, wherein the rotary motor is further of a cordless type.

6. The apparatus as recited in claim 5, wherein the rotary motor rotates the drive shaft and eccentric weight at a rate ranging between 850 and 950 revolutions per minute.

7. The apparatus as recited in claim 1, wherein the waste receptacle includes slots extending through the receptacle to allow small particulate to pass through the slots and further wherein the waste receptacle includes a row of tines extending from the forward facing edge of the receptacle.

8. The apparatus as recited in claim 1, wherein the waste receptacle includes slots extending through the receptacle to allow small particulate to pass through the slots and further wherein the waste receptacle includes a scraper extending from the forward facing edge of the receptacle.

9. The apparatus as recited in claim 1, wherein the aperture extending through the eccentric weight has a square cross section.

10. A manure rake apparatus, said apparatus comprising:
a waste receptacle having a forward facing edge defining an opening into the receptacle;
a handle including a sheath and drive shaft extending through an interior of the sheath, wherein a first end of the handle is fixed to the receptacle and a second end opposing the first end is fixed to a first hand grip;
a second hand grip fixed to the sheath of the handle between the first end of the handle and the second end of the handle;
a rotary motor coupled to a first end portion of the drive shaft;
a shaker assembly including a housing, waste receptacle end cap, handle end cap, and an eccentric weight, wherein the drive shaft extends through the handle end cap, housing and waste receptacle end cap and further wherein the drive shaft includes a coupler that couples the shaft to an aperture extending through the eccentric weight;
a rubbing block extending from the handle end cap and arranged to contact the eccentric weight once every full revolution of the eccentric weight; and
wherein the aperture of the eccentric weight extends through the eccentric weight such that a central axis of the aperture is not perpendicular to the rotational plane of the weight.

11. The apparatus as recited in claim 10, further including ball bearings engaged to the shaker assembly and the drive shaft.

12. The apparatus as recited in claim 11, wherein the rotary motor is of a variable speed type.

13. The apparatus as recited in claim 12, wherein the rotary motor is further of a cordless type.

14. The apparatus as recited in claim 13, wherein the rotary motor rotates the drive shaft and eccentric weight at a rate ranging between 850 and 950 revolutions per minute.

15. The apparatus as recited in claim 12, wherein the waste receptacle includes slots extending through the receptacle to allow small particulate to pass through the slots and further wherein the waste receptacle includes a row of tines extending from the forward facing edge of the receptacle.

16. The apparatus as recited in claim 12, wherein the waste receptacle includes slots extending through the receptacle to allow small particulate to pass through the slots and further wherein the waste receptacle includes a scraper extending from the forward facing edge of the receptacle.

17. The apparatus as recited in claim 10, wherein the aperture extending through the eccentric weight has a square cross section.

18. A manure rake apparatus, said apparatus comprising:
a waste receptacle having a forward facing edge defining an opening into the receptacle;
a handle including a sheath and drive shaft extending through an interior of the sheath, wherein a first end of the handle is fixed to the receptacle and a second end opposing the first end is fixed to a first hand grip;
a second hand grip fixed to the sheath of the handle between the first end of the handle and the second end of the handle;
a rotary motor coupled to a first end portion of the drive shaft;
a shaker assembly including a housing, waste receptacle end cap, handle end cap, and an eccentric weight, wherein the drive shaft extends through the handle end cap, housing and waste receptacle end cap and further wherein the drive shaft includes a coupler that couples the shaft to an aperture extending through the eccentric weight, wherein the aperture extending through the eccentric weight has a square cross section;
ball bearings engaged to the shaker assembly and the drive shaft;
a rubbing block extending from the handle end cap and arranged to contact the eccentric weight once every full revolution of the eccentric weight; and
wherein the aperture of the eccentric weight extends through the eccentric weight such that a central axis of the aperture is not perpendicular to the rotational plane of the weight.

19. The apparatus as recited in claim 18, wherein the rotary motor is of a cordless, variable speed type that rotates the drive shaft and eccentric weight at a rate ranging between 850 and 950 revolutions per minute.

20. The apparatus as recited in claim 18, wherein the waste receptacle includes slots extending through the receptacle to allow small particulate to pass through the slots and further wherein the waste receptacle includes a row of tines extending from the forward facing edge of the receptacle.

21. The apparatus as recited in claim 18, wherein the waste receptacle includes slots extending through the receptacle to allow small particulate to pass through the slots and further wherein the waste receptacle includes a scraper extending from the forward facing edge of the receptacle.

* * * * *